US012749426B2

(12) United States Patent
Ren et al.

(10) Patent No.: US 12,749,426 B2
(45) Date of Patent: Sep. 29, 2026

(54) SIGNAL GENERATION CIRCUIT, DRIVING METHOD THEREOF AND DISPLAY DEVICE

(71) Applicants: Beijing BOE Technology Development Co., Ltd., Beijing (CN); BOE TECHNOLOGY GROUP CO., LTD., Beijing (CN)

(72) Inventors: Jinyu Ren, Beijing (CN); Fangzhen Zhang, Beijing (CN); Wei Wang, Beijing (CN); Yanan Niu, Beijing (CN); Zhikun Gao, Beijing (CN); Xinxing Wang, Beijing (CN)

(73) Assignees: BEIJING BOE TECHNOLOGY DEVELOPMENT CO., LTD., Beijing (CN); BOE TECHNOLOGY GROUP CO. LTD, Beijing (CN)

( * ) Notice: Subject to any disclaimer, the term of this patent is extended or adjusted under 35 U.S.C. 154(b) by 7 days.

(21) Appl. No.: 19/107,939

(22) PCT Filed: May 29, 2024

(86) PCT No.: PCT/CN2024/096055
§ 371 (c)(1),
(2) Date: Feb. 28, 2025

(87) PCT Pub. No.: WO2025/245736
PCT Pub. Date: Dec. 4, 2025

(65) Prior Publication Data
US 2026/0170994 A1 Jun. 18, 2026

(51) Int. Cl.
*G09G 3/20* (2006.01)

(52) U.S. Cl.
CPC ....... *G09G 3/2092* (2013.01); *G09G 2310/08* (2013.01)

(58) Field of Classification Search
CPC ......................... G09G 3/2092; G09G 2310/08
See application file for complete search history.

(56) References Cited

U.S. PATENT DOCUMENTS 9,608,614 B2 * 3/2017 Sugiyama ............ G09G 3/3233
9,721,674 B2 * 8/2017 Gu ......................... G11C 19/28
(Continued)

FOREIGN PATENT DOCUMENTS

CN 105096823 A 11/2015
CN 114078417 A * 2/2022 ............... G09G 3/20
(Continued)

OTHER PUBLICATIONS

Machine translation of CN-114078417-A. (Year: 2026).*
Machine translation of CN-116364002-A. (Year: 2026).*

*Primary Examiner* — Michael Pervan
(74) *Attorney, Agent, or Firm* — MUNCY, GEISSLER, OLDS & LOWE, P.C.

(57) ABSTRACT

Provided are a signal generation circuit, a driving method thereof and a display device. The signal generation circuit includes: a first control sub-circuit, a second control sub-circuit, an output control node and a target output terminal, the output control node is coupled to the target output terminal; the first control sub-circuit is coupled to a control signal input terminal, a first level signal input terminal and the output control node, and is configured to control an electrical connection between the first level signal input terminal and the output control node to be turned on or turned off under the control of the control signal input terminal; and the second control sub-circuit is coupled to an adjustable data signal input terminal, an analog signal input terminal and the output control node.

20 Claims, 12 Drawing Sheets

(56) References Cited

U.S. PATENT DOCUMENTS

| | | | | | |
|---|---|---|---|---|---|
| 9,906,212 | B2 * | 2/2018 | Sugiyama | H04N 25/78 | |
| 11,328,672 | B2 * | 5/2022 | Feng | G09G 3/3225 | |
| 12,604,479 | B2 * | 4/2026 | Sato | H10B 51/30 | |
| 2015/0187335 | A1 * | 7/2015 | Sugiyama | H04N 25/78 | 345/208 |
| 2016/0125847 | A1 * | 5/2016 | Gu | G11C 19/28 | 345/99 |
| 2017/0163253 | A1 * | 6/2017 | Sugiyama | H03K 5/2481 | |
| 2021/0201806 | A1 * | 7/2021 | Feng | G11C 19/28 | |

FOREIGN PATENT DOCUMENTS

| | | | | | |
|---|---|---|---|---|---|
| CN | 116364002 | A | * | 6/2023 | G09G 3/3208 |
| CN | 117079574 | A | | 11/2023 | |

* cited by examiner

SIGNAL GENERATION CIRCUIT, DRIVING METHOD THEREOF AND DISPLAY DEVICE

CROSS-REFERENCE TO RELATED APPLICATION

This application is the U.S. national phase of PCT Application No. PCT/CN2024/096055 filed on May 29, 2024, the disclosure of which is incorporated in its entirety by reference herein.

TECHNICAL FIELD

The present disclosure relates to the field of display technologies, in particular to a signal generation circuit, a driving method thereof and a display device.

BACKGROUND

With the continuous development of display technologies, display products are gradually moving towards high-end technologies such as high resolution and low power consumption, and corresponding functions of a driving circuit in the display product are also increasing. The driving circuit is coupled to a driving chip in the display product. A corresponding signal is provided to the driving circuit by a channel of the driving chip, and the driving circuit implements the driving functions based on the signal.

SUMMARY

The disclosure is to provide a signal generation circuit, a driving method thereof and a display device.

In order to achieve the above objective, the present disclosure provides the following technical solutions.

In a first aspect, the present disclosure provides a signal generation circuit, including: a first control sub-circuit, a second control sub-circuit, an output control node and a target output terminal, where the output control node is coupled to the target output terminal;

the first control sub-circuit is coupled to a control signal input terminal, a first level signal input terminal and the output control node, and is configured to control an electrical connection between the first level signal input terminal and the output control node to be turned on or turned off under the control of the control signal input terminal; and the second control sub-circuit is coupled to an adjustable data signal input terminal, an analog signal input terminal and the output control node, and is configured to control an electrical connection between the analog signal input terminal and the output control node to be turned on or turned off under the joint control of the adjustable data signal input terminal and the analog signal input terminal.

Optionally, the signal generation circuit further includes: an output control sub-circuit, where the output control node is coupled to the target output terminal through the output control sub-circuit, the output control sub-circuit is further coupled to the first level signal input terminal and a second level signal input terminal, and the output control sub-circuit is configured to: under the control of the output control node, control the target output terminal to receive a first level signal outputted by the first level signal input terminal, or to control the target output terminal to receive a second level signal outputted by the second level signal input terminal.

Optionally, the output control sub-circuit is configured to control the electrical connection between the second level signal input terminal and the target output terminal to be turned on or turned off under the control of the output control node, and is further configured to control the electrical connection between the first level signal input terminal and the target output terminal to be turned on under the control of the first level signal input terminal.

Optionally, the signal generation circuit further includes: a first control unit and a second control unit, where a first terminal of the first control unit is coupled to the output control node, a second terminal of the first control unit is coupled to the second level signal input terminal, and a third terminal of the first control unit is coupled to the target output terminal; the first control unit is configured to control the electrical connection between the second level signal input terminal and the target output terminal to be turned on or turned off under the control of the output control node; and a first terminal of the second control unit is coupled to the first level signal input terminal, a second terminal of the second control unit is coupled to the first level signal input terminal, and a third terminal of the second control unit is coupled to the target output terminal; the second control unit is configured to control the electrical connection between the first level signal input terminal and the target output terminal to be turned on or turned off under the control of the first level signal input terminal.

Optionally, the signal generation circuit further includes: a first output compensation sub-circuit, where the third terminal of the first control unit and the third terminal of the second control unit are coupled to each other, and are coupled to the target output terminal through the first output compensation sub-circuit; the first output compensation sub-circuit is further coupled to the first level signal input terminal, the second level signal input terminal, and the output control node; and the first output compensation sub-circuit is configured to control the electrical connection between the second level signal input terminal and the target output terminal to be turned on or turned off under the control of the output control node, and is further configured to control the electrical connection between the first level signal input terminal and the target output terminal to be turned on or turned off under the control of the third terminal of the first control unit.

Optionally, the first output compensation sub-circuit includes: a third control unit and a fourth control unit; the third control unit is coupled to the output control node, the second level signal input terminal, and the target output terminal, and is configured to control the electrical connection between the second level signal input terminal and the target output terminal to be turned on or turned off under the control of the output control node; and the fourth control unit is coupled to the third terminal of the first control unit, the first level signal input terminal, and the target output terminal, and is configured to control the electrical connection between the first level signal input terminal and the target output terminal to be turned on or turned off under the control of the third terminal of the first control unit.

Optionally, the signal generation circuit further includes a second output compensation sub-circuit, where the third terminal of the first control unit and the third terminal of the second control unit are coupled to each other, and are coupled to the target output terminal through the second output compensation sub-circuit; the second output compensation sub-circuit is further coupled to the control signal input terminal, the first level signal input terminal, and the second level signal input terminal; and the second output compensation sub-circuit is configured to control the electrical connection between the second level signal input terminal and the target output terminal to be turned on or turned off under the control of the third terminal of the first control unit; and is further configured to control the electrical connection between the first level signal input terminal and the target output terminal to be turned on or turned off under the control of the control signal input terminal.

Optionally, the second output compensation sub-circuit includes: a fifth control unit and a sixth control unit; the fifth control unit is coupled to the third terminal of the first control unit, the second level signal input terminal, and the target output terminal, and is configured to control the electrical connection between the second level signal input terminal and the target output terminal to be turned on or turned off under the control of the third terminal of the first control unit; and the sixth control unit is coupled to the control signal input terminal, the first level signal input terminal, and the target output terminal, and is configured to control the electrical connection between the first level signal input terminal and the target output terminal to be turned on or turned off under the control of the control signal input terminal.

Optionally, the output control sub-circuit is configured to control the electrical connection between the second level signal input terminal and the target output terminal to be turned on or turned off under the control of the output control node, and is further configured to control the electrical connection between the first level signal input terminal and the target output terminal to be turned on or turned off under the control of the output control node.

Optionally, the output control sub-circuit includes a seventh control unit and an eighth control unit; the seventh control unit is coupled to the output control node, the second level signal input terminal, and the target output terminal, and is configured to control the electrical connection between the second level signal input terminal and the target output terminal to be turned on or turned off under the control of the output control node; and the eighth control unit is coupled to the output control node, the first level signal input terminal, and the target output terminal, and is configured to control the electrical connection between the first level signal input terminal and the target output terminal to be turned on or turned off under the control of the output control node.

Optionally, the signal generation circuit further includes: a third output compensation sub-circuit, coupled to the target output terminal, the second level signal input terminal and the output control node, and configured to control the electrical connection between the second level signal input terminal and the output control node to be turned on or turned off under the control of the target output terminal.

Optionally, the first control sub-circuit includes a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit includes a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit includes a third transistor, and a gate electrode of the third transistor and a second electrode of the third transistor are both coupled to the first level signal input terminal;

the first control unit includes a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal;

the fourth control unit includes a fifth transistor, a gate electrode of the fifth transistor is coupled to the first electrode of the fourth transistor, a first electrode of the fifth transistor is coupled to the first level signal input terminal, and a second electrode of the fifth transistor is coupled to the target output terminal; and the third control unit includes a sixth transistor, a gate electrode of the sixth transistor is coupled to the output control node, a first electrode of the sixth transistor is coupled to the second level signal input terminal, and a second electrode of the sixth transistor is coupled to the target output terminal.

Optionally, the first control sub-circuit includes a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit includes a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit includes a third transistor, and a gate electrode of the third transistor and a second electrode of the third transistor are both coupled to the first level signal input terminal;

the first control unit includes a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal;

the sixth control unit includes an eighth transistor and a second capacitor; a gate electrode of the eighth transistor is coupled to the control signal input terminal, a first electrode of the eighth transistor is coupled to the first level signal input terminal, and a second electrode of the eighth transistor is coupled to the target output terminal; a first electrode plate of the second capacitor is coupled to the first level signal input terminal, a second electrode plate of the second capacitor is coupled to the target output terminal; and the fifth control unit includes a ninth transistor, a gate electrode of the ninth transistor is coupled to the first electrode of the fourth transistor, a first electrode of the ninth transistor is coupled to the second level signal input terminal, and a second electrode of the ninth transistor is coupled to the target output terminal.

Optionally, the first control sub-circuit includes a first transistor, where a gate electrode of the first transistor is coupled to the control signal input terminal, a first electrode of the first transistor is coupled to the first level signal input terminal, and a second electrode of the first transistor is coupled to the output control node;

the second control sub-circuit includes a second transistor, a gate electrode of the second transistor is coupled to the adjustable data signal input terminal, a first electrode of the second transistor is coupled to the analog signal input terminal, and a second electrode of the fourth transistor is coupled to the output control node;

the seventh control unit includes a tenth transistor, a gate electrode of the tenth transistor is coupled to the output control node, a first electrode of the tenth transistor is coupled to the second level signal input terminal, and a second electrode of the tenth transistor is coupled to the target output terminal; and the eighth control unit includes an eleventh transistor, a gate electrode of the eleventh transistor is coupled to the output control node, a first electrode of the eleventh transistor is coupled to the first level signal input terminal, and a second electrode of the eleventh transistor is coupled to the target output terminal; one of the eleventh transistor and the tenth transistor is a P-type transistor, and another of the eleventh transistor and the tenth transistor is an N-type transistor.

Optionally, the third output compensation sub-circuit includes a twelfth transistor, a gate electrode of the twelfth transistor is coupled to the target output terminal, a first electrode of the twelfth transistor is coupled to the second level signal input terminal, and a second electrode of the twelfth transistor is coupled to the output control node.

Optionally, the first control sub-circuit includes a first transistor, a gate electrode of the first transistor is coupled to the control signal input terminal, a first electrode of the first transistor is coupled to the first level signal input terminal, and a second electrode of the first transistor is coupled to the output control node; and the second control sub-circuit includes a second transistor, a gate electrode of the second transistor is coupled to the adjustable data signal input terminal, a first electrode of the second transistor is coupled to the analog signal input terminal, and a second electrode of the second transistor is coupled to the output control node.

Optionally, the first control sub-circuit includes a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit includes a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit includes a third transistor, and a gate electrode of the third transistor and a second electrode of the third transistor are both coupled to the first level signal input terminal; and the first control unit includes a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal.

Optionally, the signal generation circuit further includes a capacitor structure, a first end of the capacitor structure is coupled to the output control node, and a second end of the capacitor structure is coupled to the first level signal input terminal.

Optionally, the analog signal input terminal is used to input an analog signal with periodicity, and a level value of the analog signal varies linearly within one cycle.

In a second aspect, based on the technical solution of the above signal generation circuit, an embodiment of the present disclosure provides a display device, which includes the above signal generation circuit.

In a third aspect, based on the technical solution of the above signal generation circuit, an embodiment of the present disclosure provides a driving method of a signal generation circuit, for driving the above signal generation circuit. The driving method includes periodic output stages, and the output stage includes a first level output phase and a second level output phase, where a periodic analog signal is inputted into the analog signal input terminal; in one of the output stages, a level value of the analog signal varies linearly;

in the first level output phase, controlling, by the second control sub-circuit, the electrical connection between the analog signal input terminal and the output control node to be turned off under the joint control of the adjustable data signal input terminal and the analog signal input terminal;

in an initial time of the first level output phase, controlling, by the first control sub-circuit, the electrical connection between the first level signal input terminal and the output control node to be turned on under the control of the control signal input terminal; and in a non-initial time of the first level output phase, controlling, by the first control sub-circuit, the electrical connection between the first level signal input terminal and the output control node to be turned off under the control of the control signal input terminal; and in the second level output phase, controlling, by the first control sub-circuit, the electrical connection between the first level signal input terminal and the output control node to be turned off under the control of the control signal input terminal, and controlling, by the second control sub-circuit, the electrical connection between the analog signal input terminal and the output control node to be turned on under the joint control of the adjustable data signal input terminal and the analog signal input terminal.

Optionally, the signal generation circuit further includes an output control sub-circuit, the output control node is coupled to the target output terminal through the output control sub-circuit, and the output control sub-circuit is further coupled to the first level signal input terminal and the second level signal input terminal; and the driving method further includes:

in the first level output phase, controlling, by the output control sub-circuit, the target output terminal to receive a second level signal outputted by the second level signal input terminal under the control of the output control node; and in the second level output phase, controlling, by the output control sub-circuit, the target output terminal to receive a first level signal outputted by the first level signal input terminal under the control of the output control node.

Optionally, in the first level output phase, controlling, by the output control sub-circuit, the electrical connection between the first level signal input terminal and the target output terminal to be turned on under the control of the first level signal input terminal, and controlling, by the output control sub-circuit, the electrical connection between the second level signal input terminal and the target output terminal to be turned on under the control of the output control node; and in the second level output phase, controlling, by the output control sub-circuit, the electrical connection between the first level signal input terminal and the target output terminal to be turned on under the control of the first level signal input terminal, and controlling, by the output control sub-circuit, the electrical connection between the second level signal input terminal and the target output terminal to be turned off under the control of the output control node.

Optionally, the output control sub-circuit includes: a first control unit and a second control unit; a first terminal of the first control unit is coupled to the output control node, a second terminal of the first control unit is coupled to the second level signal input terminal, and a third terminal of the first control unit is coupled to the target output terminal; a first terminal of the second control unit is coupled to the first level signal input terminal, a second terminal of the second control unit is coupled to the first level signal input terminal, and a third terminal of the second control unit is coupled to the target output terminal; and the driving method further includes:

in the first level output phase, controlling, by the first control unit, the electrical connection between the second level signal input terminal and the target output terminal to be turned on under the control of the output control node, and controlling, by the second control unit, the electrical connection between the first level signal input terminal and the third terminal of the second control unit to be turned on under the control of the first level signal input terminal; and in the second level output phase, controlling, by the first control unit, the electrical connection between the second level signal input terminal and the target output terminal to be turned off under the control of the output control node, and controlling, by the second control unit, the electrical connection between the first level signal input terminal and the target output terminal to be turned on under the control of the first level signal input terminal.

Optionally, the signal generation circuit further includes: a first output compensation sub-circuit, the third terminal of the first control unit and the third terminal of the second control unit are coupled to each other, and are coupled to the target output terminal through the first output compensation sub-circuit; the first output compensation sub-circuit is further coupled to the first level signal input terminal, the second level signal input terminal and the output control node; and the driving method further includes:

in the first level output phase, controlling, by the first output compensation sub-circuit, the electrical connection between the second level signal input terminal and the target output terminal to be turned on under the control of the output control node, and controlling, by the first output compensation sub-circuit, the electrical connection between the first level signal input terminal and the target output terminal to be turned off under the control of the third terminal of the first control unit; and in the second level output phase, controlling, by the first output compensation sub-circuit, the electrical connection between the second level signal input terminal and the target output terminal to be turned off under the control of the output control node, and controlling, by the first output compensation sub-circuit, the electrical connection between the first level signal input terminal and the target output terminal to be turned on under the control of the third terminal of the first control unit.

Optionally, the signal generation circuit further includes a second output compensation sub-circuit, where the third terminal of the first control unit and the third terminal of the second control unit are coupled to each other, and are coupled to the target output terminal through the second output compensation sub-circuit; the second output compensation sub-circuit is further coupled to the control signal input terminal, the first level signal input terminal, and the second level signal input terminal; and the driving method further includes:

in the first level output phase, controlling, by the second output compensation sub-circuit, the electrical connection between the second level signal input terminal and the target output terminal to be turned off under the control of the third terminal of the first control unit, and controlling, by the second output compensation sub-circuit, the electrical connection between the first level signal input terminal and the target output terminal to be turned on under the control of the control signal input terminal; and in the second level output phase, controlling, by the second output compensation sub-circuit, the electrical connection between the second level signal input terminal and the target output terminal to be turned on under the control of the third terminal of the first control unit, and controlling, by the second output compensation sub-circuit, the electrical connection between the first level signal input terminal and the target output terminal to be turned off under the control of the control signal input terminal.

Optionally, in the first level output phase, controlling, by the output control sub-circuit, the electrical connection between the second level signal input terminal and the target output terminal to be turned on under the control of the output control node, and controlling, by the output control sub-circuit, the electrical connection between the first level signal input terminal and the target output terminal to be turned off under the control of the output control node; and in the second level output phase, controlling, by the output control sub-circuit, the electrical connection between the second level signal input terminal and the target output terminal to be turned off under the control of the output control node, and controlling, by the output control sub-circuit, the electrical connection between the first level signal input terminal and the target output terminal to be turned on under the control of the output control node.

Optionally, the signal generation circuit further includes a third output compensation sub-circuit, coupled to the target output terminal, the second level signal input terminal and the output control node; and the driving method further includes:

in the first level output phase, controlling, by the third output compensation sub-circuit, the electrical connection between the second level signal input terminal and the output control node to be turned off under the control of the target output terminal; and in the second level output phase, controlling, by the third output compensation sub-circuit, the electrical connection between the second level signal input terminal and the output control node to be turned on under the control of the target output terminal.

BRIEF DESCRIPTION OF THE DRAWINGS

The accompanying drawings described herein are intended to provide further understanding of the present disclosure and form a part of the present disclosure. The illustrative embodiments of the present disclosure and their descriptions are used to explain the present disclosure and do not constitute undue limitations onto the present disclosure. In the appended drawings.

DETAILED DESCRIPTION

In order to further illustrate a signal generation circuit, a driving method thereof and a display device provided in the embodiments of the present disclosure, a detailed description will be provided below in conjunction with the accompanying drawings of the specification.

With the continuous development of the display technologies, display products are gradually moving towards directions of high resolution, low power consumption, or etc. Corresponding functions of a driving circuit in the display product are also increasing. In order to achieve more functions, a timing signal usually needs to be introduced to the driving circuit. The timing signal has a wide range of applications in display products, such as a clock signal used in a gate drive circuit (such as GOA, EOA), and pulse width modulation signals (PWM) with different duty cycles used for driving pixels.

In the related technologies, all timing signals required for PWM, GOA, EOA, etc. are provided by the driving chip, and a cycle frequency and a duty cycle of the timing signal provided by the driving chip are not adjustable. If multiple signals with different duty cycles are required, the signals need to be provided separately through multiple channels of the driving chip. However, the number of the channels in the driving chip of a high-resolution display product is tight, and backplane wires need to be increased to correspond to the multiple channels in the limited layout space, which brings difficulties to adjusting a brightness, a frequency or the like of a display by adjusting the duty cycle of the timing signal.

Therefore, how to adjust the cycle frequency and the duty cycle of the timing signal without occupying too many driver chip channels has become an urgent technical problem to be solved.

Figure 23:
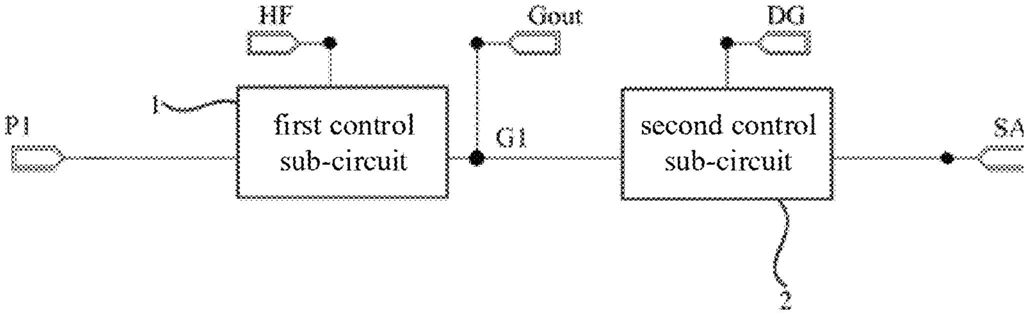
FIG. 23 is a schematic diagram of a seventh module of a signal generation circuit provided by an embodiment of the present disclosure.

Referring to FIG. 23, an embodiment of the present disclosure provides a signal generation circuit, which includes: a first control sub-circuit 1, a second control sub-circuit 2, an output control node G1 and a target output terminal Gout; the output control node G1 is coupled to the target output terminal Gout.

The first control sub-circuit 1 is coupled to a control signal input terminal HF, a first level signal input terminal P1 and the output control node G1, and is configured to control an electrical connection between the first level signal input terminal P1 and the output control node G1 to be turned on or turned off under the control of the control signal input terminal HF.

The second control sub-circuit 2 is coupled to an adjustable data signal input terminal DG, an analog signal input terminal SA and the output control node G1, and is configured to control an electrical connection between the analog signal input terminal SA and the output control node G1 to be turned on or turned off under the joint control of the adjustable data signal input terminal DG and the analog signal input terminal SA.

For example, the analog signal input terminal SA is used to input an analog signal with periodicity, and a level value of the analog signal varies linearly within one cycle.

For example, when driving the signal generation circuit, the driving method includes a periodic output stage, and the output stage includes a first level output phase and a second level output phase. One of the first level output phase and the second level output phase is used as an effective level output phase, and the other is used as an ineffective level output phase. A target signal outputted by a target output terminal Gout has an effective level in the effective level output phase and an ineffective level in the ineffective level output phase, and a ratio of a duration of the target signal at the effective level to a total duration of one cycle is the duty cycle of the target signal.

For example, the control signal input terminal HF is used to input a timing control signal with periodicity, the first level signal input terminal P1 is used to input a first level signal, and the first control sub-circuit 1 is configured to control whether to transmit the first level signal to the output control node G1 under the control of the timing control signal.

For example, the adjustable data signal input terminal DG is used to input an adjustable data signal, and a data voltage value of the adjustable data signal can be adjusted as needed at multiple output stages. The analog signal input terminal SA is used to input an analog signal with a period, and this period corresponds to the period of the output stage. A level value of the analog signal changes linearly within one period, and level changes of the analog signal in different output stages are the same, but not limited to this.

For example, the second control sub-circuit 2 controls whether to transmit the analog signal to the output control node G1 under the joint control of the adjustable data signal and the analog signal.

According to the specific structure of the signal generation circuit mentioned above, the first control sub-circuit 1 can control whether to transmit the first level signal to the output control node G1 under the control of the control signal input terminal HF; the second control sub-circuit 2 can control whether to transmit the analog signal to the output control node G1 under the joint control of the adjustable data signal input terminal DG and the analog signal input terminal SA.

During one output stage of the signal generation circuit, in a first level output phase, the second control sub-circuit 2 controls the electrical connection between the analog signal input terminal SA and the output control node G1 to be turned off under the joint control of the adjustable data signal input terminal DG and the analog signal input terminal SA.

In an initial time of the first level output phase, the first control sub-circuit 1 is configured to control the electrical connection between the first level signal input terminal P1 and the output control node G1 to be turned on under the control of the control signal input terminal HF. In a non-initial time of the first level output phase, the first control sub-circuit 1 is configured to control the electrical connection between the first level signal input terminal P1 and the output control node G1 to be turned off under the control of the control signal input terminal HF.

Therefore, in the first level output phase, the output control node G1 has the same potential as the first level signal.

In the second level output phase, the first control sub-circuit 1 is configured to control the electrical connection between the first level signal input terminal P1 and the output control node G1 to be turned off under the control of the control signal input terminal HF; the second control sub-circuit 2 is configured to control the electrical connection between the analog signal input terminal SA and the output control node G1 to be turned on under the joint control of the adjustable data signal input terminal DG and the analog signal input terminal SA.

Therefore, in the second level output phase, the output control node G1 has the same potential as the analog signal.

The data voltage value of the adjustable data signal can be adjusted at any time, and the level value of the analog signal varies linearly. Therefore, in one output stage, in the case of a fixed data voltage value, as the level value of the analog signal changes, the second control sub-circuit 2 can control the electrical connection between the analog signal input terminal SA and the output control node G1 to be turned off when the level value of the analog signal is greater than (or less than) a certain threshold, to enable the output control node G1 to have the first level same as the first level signal; the second control sub-circuit 2 can control the electrical connection between the analog signal input terminal SA and the output control node G1 to be turned on when the level value of the analog signal is less than (or greater than) the certain threshold, to enable the output control node G1 to have the second potential same as the analog signal. One of the first potential and the second potential controls the target signal to have an effective level within the effective level output phase, while the other of the first potential and the second potential controls the target signal to have an ineffective level within the ineffective level output phase. Furthermore, in different output stages, by changing the data voltage value, a duration during which the output control node G1 is at the first potential and a duration during which the output control node G1 is at the second potential can be adjusted, thereby changing a duration during which the target signal is at the effective level and a duration during which the target signal is at the ineffective level. The target signal can be used as a clock signal in the gate drive circuit (such as GOA and EOA) and as a pulse width modulation signal (PWM) with different duty cycles for driving pixels, but is not limited to these.

In the signal generation circuit provided in the embodiments of the present disclosure, by changing the data voltage value of the adjustable data signal input terminal DG and setting the level value of the analog signal input terminal SA to linearly change in each output stage, the duration during which the output control node G1 is at the first potential and the duration during which the output control node G1 is at the second potential can be controlled, thereby controlling the duration during which the target signal is at the effective level and the duration during which the target signal is at the ineffective level, and achieving the adjustment of the duty cycle of the target signal.

Moreover, in the signal generation circuit provided in the embodiment of the present disclosure, whether to turn on the first control sub-circuit 1 can be controlled by the control signal inputted from the control signal input terminal HF, whether to turn on the second control sub-circuit 2 can be controlled by the adjustable data signal inputted from the adjustable data signal input terminal DG and the analog signal inputted from the analog signal input terminal SA. Therefore, the frequency of the target signal periodically outputted is determined jointly by the control signal input terminal HF, the adjustable data signal input terminal DG, and the analog signal input terminal SA.

Therefore, in the signal generation circuit provided in the embodiments of the present disclosure, real-time adjustment of the period, the frequency and the duty cycle of the target signal outputted by the target output terminal Gout can be achieved just by adjusting the control signal, the adjustable data signal, and the analog signal. Therefore, the signal generation circuit provided in the embodiments of the present disclosure can adjust the frequency and the duty cycle of the target signal without occupying too many channels of the driving chip. In this way, it is more conducive to achieving high-resolution layout of a display product and real-time adjustment of display brightness and frequency when applying the signal generation circuit provided in the embodiments of the present disclosure to the display product.

Figure 2:
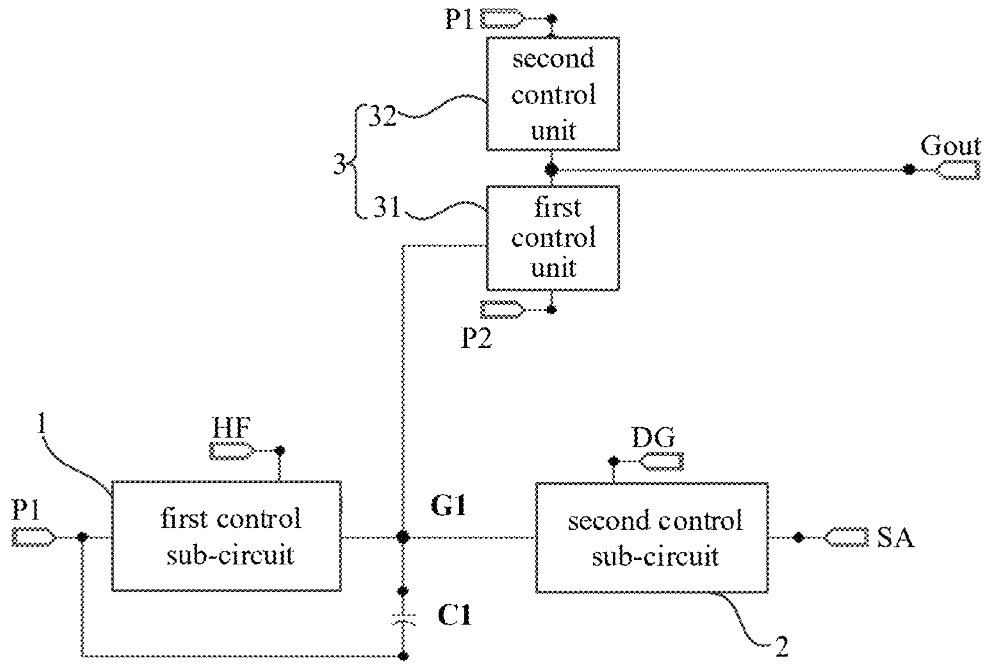
FIG. 2 is the schematic diagram of a second module of a signal generation circuit provided by an embodiment of the present disclosure.
Figure 15:
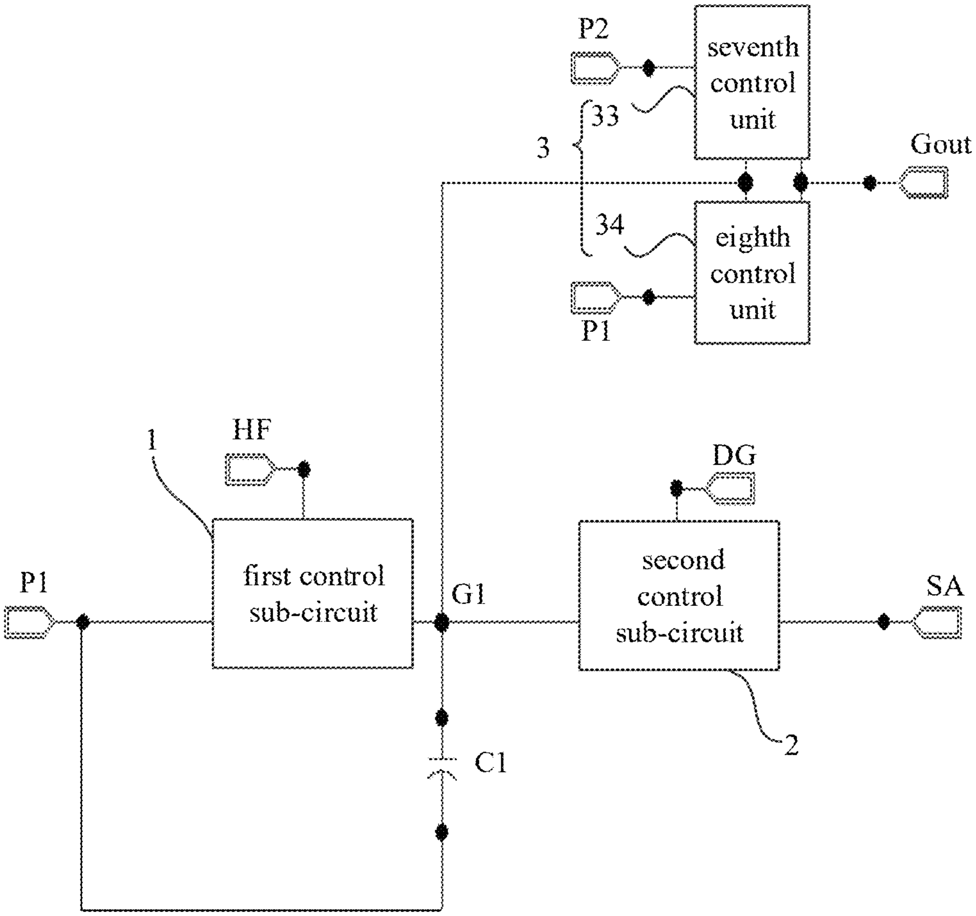
FIG. 15 is a schematic diagram of a fifth module of a signal generation circuit provided by an embodiment of the present disclosure.

As shown in FIG. 2 and FIG. 15, in some embodiments, the signal generation circuit further includes: an output control sub-circuit 3, where the output control node G1 is coupled to the target output terminal Gout through the output control sub-circuit 3, the output control sub-circuit 3 is also coupled to the first level signal input terminal P1 and the second level signal input terminal P2, the output control sub-circuit 3 is configured to: under the control of the output control node G1, control the target output terminal Gout to receive a first level signal outputted by the first level signal input terminal P1, or to control the target output terminal Gout to receive a second level signal outputted by the second level signal input terminal P2.

In the first level output phase, the output control sub-circuit 3 controls the target output terminal Gout to receive the second level signal outputted by the second level signal input terminal, under the control of the output control node G1; in the second level output phase, the output control sub-circuit 3 controls the target output terminal Gout to receive the first level signal outputted by the first level signal input terminal, under the control of the output control node G1.

The output control sub-circuit 3 is connected between the output control node G1 and the target output terminal Gout, and the output control sub-circuit 3 is controlled to transmit the first level signal or the second level signal to the target output terminal Gout, under the control of the output control node G1, so as to enable the output control node G1 in the first level output phase to have the same potential as the second level signal, and to enable the output control node G1 in the second level output phase to have the same potential as the first level signal.

In a case where the output control node G1 and the target output terminal Gout are directly coupled to each other, due to the linear gradual change of the analog signal, a speed of turning on the electrical connection between the analog signal input terminal SA and the output control node G1 by the second control sub-circuit 2 becomes slow, resulting in slow writing of the analog signal to the target output terminal Gout, causing a large Tf (falling time) or Tr (rising time) of the target signal, causing the high or low voltage part of the target signal to be a gradient analog signal instead of a stable DC signal, and resulting in poor stability.

In the above setting, the output control node G1 is coupled to the target output terminal Gout through the output control sub-circuit 3, so that the output control sub-circuit 3 can control the target output terminal Gout to receive the first level signal outputted by the first level signal input terminal or control the target output terminal Gout to receive the second level signal outputted by the second level signal input terminal, under the control of the output control node G1. Therefore, when the potential of the output control node G1 reaches a certain threshold, the target signal outputted by the target output terminal Gout can be controlled to be the first level signal or the second level signal, without being affected by the gradient of the analog signal, thereby ameliorating the problem of the large Tf (falling time) or Tr (rising time) of the target signal. Moreover, by controlling the target output terminal Gout to output the first level signal or the second level signal through the output control node G1, the high or low voltage part of the target signal is avoided from being a gradient analog signal, so as to enable the high or low voltage part of the target signal to be a stable DC signal with good stability.

As shown in FIG. 2, in some embodiments, the output control sub-circuit 3 is configured to control an electrical connection between the second level signal input terminal P2 and the target output terminal Gout to be turned on or turned off under the control of the output control node G1; and it is further configured to control an electrical connection between the first level signal input terminal P1 and the target output terminal Gout to be turned on under the control of the first level signal input terminal P1.

In the first level output phase, the output control sub-circuit 3 controls the electrical connection between the first level signal input terminal P1 and the target output terminal Gout to be turned on under the control of the first level signal input terminal P1; the output control sub-circuit 3 controls the electrical connection between the second level signal input terminal P2 and the target output terminal Gout to be turned on under the control of the output control node G1; in the second level output phase, the output control sub-circuit 3 controls the electrical connection between the first level signal input terminal P1 and the target output terminal Gout to be turned on under the control of the first level signal input terminal P1; the output control sub-circuit 3 controls the electrical connection between the second level signal input terminal P2 and the target output terminal Gout to be turned off under the control of the output control node G1.

As shown in FIG. 2, for example, the output control sub-circuit 3 includes: a first control unit 31 and a second control unit 32; a first terminal of the first control unit 31 is coupled to the output control node G1, a second terminal of the first control unit 31 is coupled to the second level signal input terminal P2, and a third terminal of the first control unit 31 is coupled to the target output terminal Gout; the first control unit 31 is configured to control an electrical connection between the second level signal input terminal P2 and the target output terminal Gout to be turned on or turned off under the control of the output control node G1; a first terminal of the second control unit 32 is coupled to the first level signal input terminal P1, a second terminal of the second control unit 32 is coupled to the first level signal input terminal P1, and a third terminal of the second control unit 32 is coupled to the target output terminal Gout; the second control unit 32 is configured to control the electrical connection between the first level signal input terminal P1 and the target output terminal Gout to be turned on under the control of the first level signal input terminal PT.

In the first level output phase, the first control unit 31 controls the electrical connection between the second level signal input terminal P2 and the target output terminal Gout to be turned on under the control of the output control node G1; the second control unit 32 is configured to control the electrical connection between the first level signal input terminal P1 and the third terminal of the second control unit 32 to be turned on under the control of the first level signal input terminal P1.

In the second level output phase, the first control unit 31 controls the disconnection of the electrical connection between the second level signal input terminal P2 and the target output terminal Gout to be turned off under the control of the output control node G1; the second control unit 32 is configured to control the electrical connection between the first level signal input terminal P1 and the target output terminal Gout to be turned on under the control of the first level signal input terminal P1.

In the above setting, the output control sub-circuit 3 can control the target output terminal Gout to receive the second level signal inputted from the second level signal input terminal P2 under the control of the output control node G1, and can control the target output terminal Gout to receive the first level signal inputted from the first level signal input terminal P1 under the control of the first level signal input terminal PT. Therefore, when the potential of the output control node G1 reaches a certain threshold, the target signal outputted by the target output terminal Gout can be controlled to be the first level signal or the second level signal, without being affected by the gradient of the analog signal, thereby alleviating the problem of large Tf (falling time) or Tr (rising time) of the target signal. Moreover, by controlling the target output terminal Gout to output the first level signal or the second level signal through the output control node G1, the high or low voltage part of the target signal is avoided from being a gradient analog signal, so as to enable the high or low voltage part of the target signal to be a stable DC signal with good stability.

Figure 3:
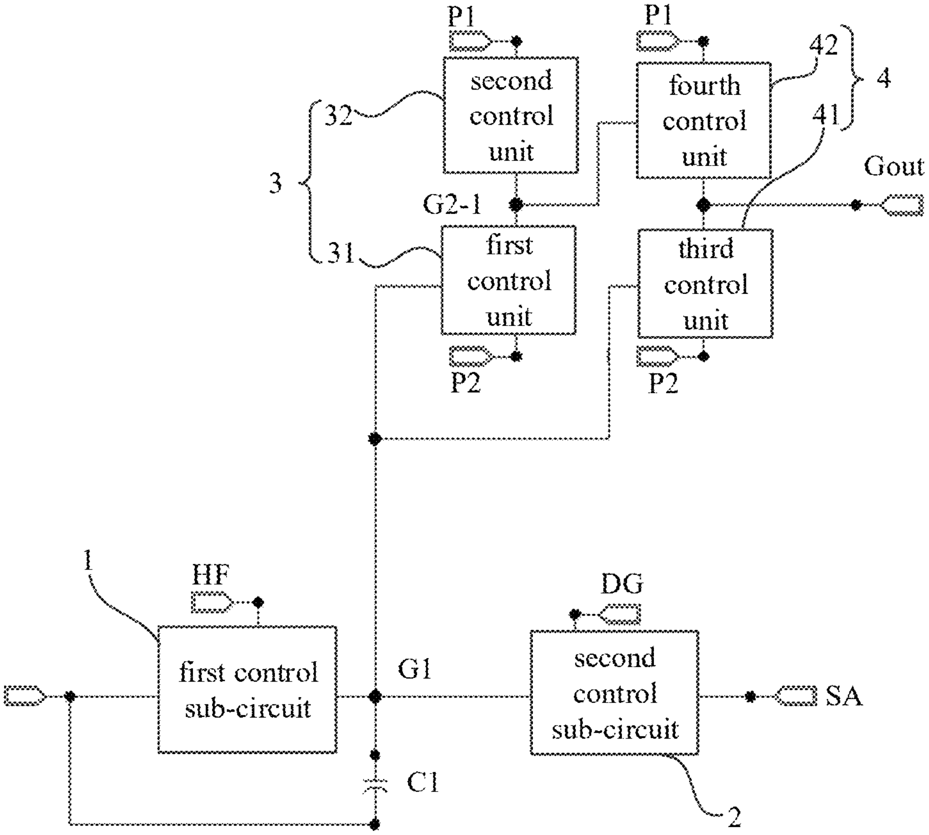
FIG. 3 is the schematic diagram of a third module of a signal generation circuit provided by an embodiment of the present disclosure.

As shown in FIG. 3, in some embodiments, the signal generation circuit further includes: a first output compensation sub-circuit 4, the third terminal of the first control unit 31 and the third terminal of the second control unit 32 are coupled to form a G2-1 node, and are coupled to the target output terminal Gout through the first output compensation sub-circuit 4; the first output compensation sub-circuit 4 is further coupled to the first level signal input terminal P1, the second level signal input terminal P2, and the output control node G1.

The first output compensation sub-circuit 4 is configured to control the electrical connection between the second level signal input terminal P2 and the target output terminal Gout to be turned on or turned off under the control of the output control node G1; and is further configured to control the electrical connection between the first level signal input terminal P1 and the target output terminal Gout to be turned on or turned off under the control of the third terminal (i.e., G2-1 node) of the first control unit 31.

In the first level output phase, the first output compensation sub-circuit 4 is configured to control the electrical connection between the second level signal input terminal P2 and the target output terminal Gout to be turned on under the control of the output control node G1; the first output compensation sub-circuit 4 is further configured to control the electrical connection between the first level signal input terminal P1 and the target output terminal Gout to be turned off under the control of the third terminal (i.e., G2-1 node) of the first control unit 31.

In the second level output phase, the first output compensation sub-circuit 4 is configured to control the electrical connection between the second level signal input terminal P2 and the target output terminal Gout to be turned off under the control of the output control node G1; the first output compensation sub-circuit 4 is further configured to control the electrical connection between the first level signal input terminal P1 and the target output terminal Gout to be turned on under the control of the third terminal (i.e., G2-1 node) of the first control unit 31.

As shown in FIG. 3, for example, the first output compensation sub-circuit 4 includes: a third control unit 41 and a fourth control unit 42; the third control unit 41 is coupled to the output control node G1, the second level signal input terminal P2, and the target output terminal Gout, and is configured to control the electrical connection between the second level signal input terminal P2 and the target output terminal Gout to be turned on or turned off under the control of the output control node G1; the fourth control unit 42 is coupled to the third terminal (i.e., G2-1 node) of the first control unit 31, the first level signal input terminal P1, and the target output terminal Gout, and is configured to control the electrical connection between the first level signal input terminal P1 and the target output terminal Gout to be turned on or turned off under the control of the third terminal (i.e., G2-1 node) of the first control unit 31.

In the first level output phase, the third control unit 41 is configured to control the electrical connection between the second level signal input terminal P2 and the target output terminal Gout to be turned on under the control of the output control node G1; the fourth control unit 42 is configured to control the electrical connection between the first level signal input terminal P1 and the target output terminal Gout to be turned off under the control of the third terminal (i.e., G2-1 node) of the first control unit 31.

In the second level output phase, the third control unit 41 is configured to control the electrical connection between the second level signal input terminal P2 and the target output terminal Gout to be turned off under the control of the output control node G1; the fourth control unit 42 is configured to control the electrical connection between the first level signal input terminal P1 and the target output terminal Gout to be turned on under the control of the third terminal (i.e., G2-1 node) of the first control unit 31.

In the case where the signal generation circuit includes the output control sub-circuit 3, but does not include the first output compensation sub-circuit 4, when both the first control unit 31 and the second control unit 32 are turned on, the potential of the target signal is actually a divided voltage between the first control unit 31 and the second control unit 32, causing that the potential of the target signal cannot fully reach the second level, and the Tf (falling time) or Tr (rising time) of the target signal still needs to be improved.

By setting the signal generation circuit to include the output control sub-circuit 3 and the first output compensation sub-circuit 4, when the potential of the target signal is controlled to be the second level, the third control unit 41 can conduct the electrical connection between the second level signal input terminal P2 and the target output terminal Gout, and the fourth control unit 42 can turn off the electrical connection between the first level signal input terminal P1 and the target output terminal Gout. Therefore, the potential of the target signal is not the divided voltage between the first control unit 31 and the second control unit 32, and the potential of the target signal can fully reach the second level. Moreover, this setting method further improves the Tf (falling time) or Tr (rising time) of the target signal.

It should be noted that a transistor labeled as M in this disclosure is an N-type transistor, and a transistor labeled as T is a P-type transistor. The N-type transistor or the P-type transistor may be used in each sub-circuit and each control unit in this disclosure. In the case of using N-type transistors, the signal generation circuit is connected to the following signal terminals: control signal input terminal HF1, adjustable data signal input terminal DGT, analog signal input terminal SAT, target output terminal GNout, first level signal input terminal P1 inputted by a VDD signal, and second level signal input terminal P2 inputted by a VSS signal. In the case of using P-type transistors, the signal generation circuit is connected to the following signal terminals: control signal input terminal HF2, adjustable data signal input terminal DG2, analog signal input terminal SA2, target output terminal GPout, first level signal input terminal P1 inputted by a VSS signal, and second level signal input terminal P2 inputted by a VDD signal.

As shown in FIG. 5 to FIG. 7 and FIG. 10 to FIG. 12, in some embodiments, the first control sub-circuit 1 includes a first transistor (such as M1 and T1), a gate electrode of the first transistor is coupled to the control signal input terminal HF, a first electrode of the first transistor is coupled to the first level signal input terminal P1, and a second electrode of the first transistor is coupled to the output control node G1.

The second control sub-circuit 2 includes a second transistor (such as M2 and T2), a gate electrode of the second transistor is coupled to the adjustable data signal input terminal DG, a first electrode of the second transistor is coupled to the analog signal input terminal SA, and a second electrode of the second transistor is coupled to the output control node G1.

The second control unit 32 includes a third transistor (such as M3 and T3), a gate electrode of the third transistor and a second electrode of the third transistor are both coupled to the first level signal input terminal PT.

The first control unit 31 includes a fourth transistor (such as M4 and T4), a gate electrode of the fourth transistor is coupled to the output control node G1, a first electrode of the fourth transistor is coupled to the first electrode of the third transistor, and a second electrode of the fourth transistor is coupled to the second level signal input terminal P2.

The fourth control unit 42 includes a fifth transistor (such as M5 and T5), a gate electrode of the fifth transistor is coupled to the first electrode of the fourth transistor, a first electrode of the fifth transistor is coupled to the first level signal input terminal P1, and a second electrode of the fifth transistor is coupled to the target output terminal Gout.

The third control unit 41 includes a sixth transistor (such as M6 and T6), a gate electrode of the sixth transistor is coupled to the output control node G1, a first electrode of the sixth transistor is coupled to the second level signal input terminal P2, and a second electrode of the sixth transistor is coupled to the target output terminal Gout.

Figure 5:
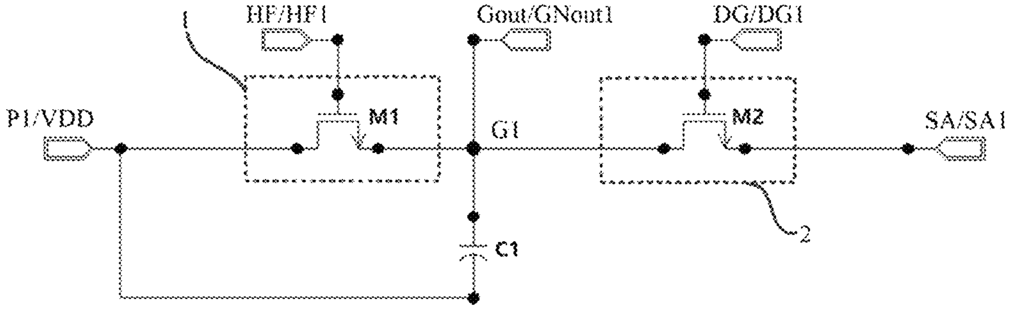
FIG. 5 is a schematic diagram of a first circuit structure of a signal generation circuit provided by an embodiment of the present disclosure.
Figure 6:
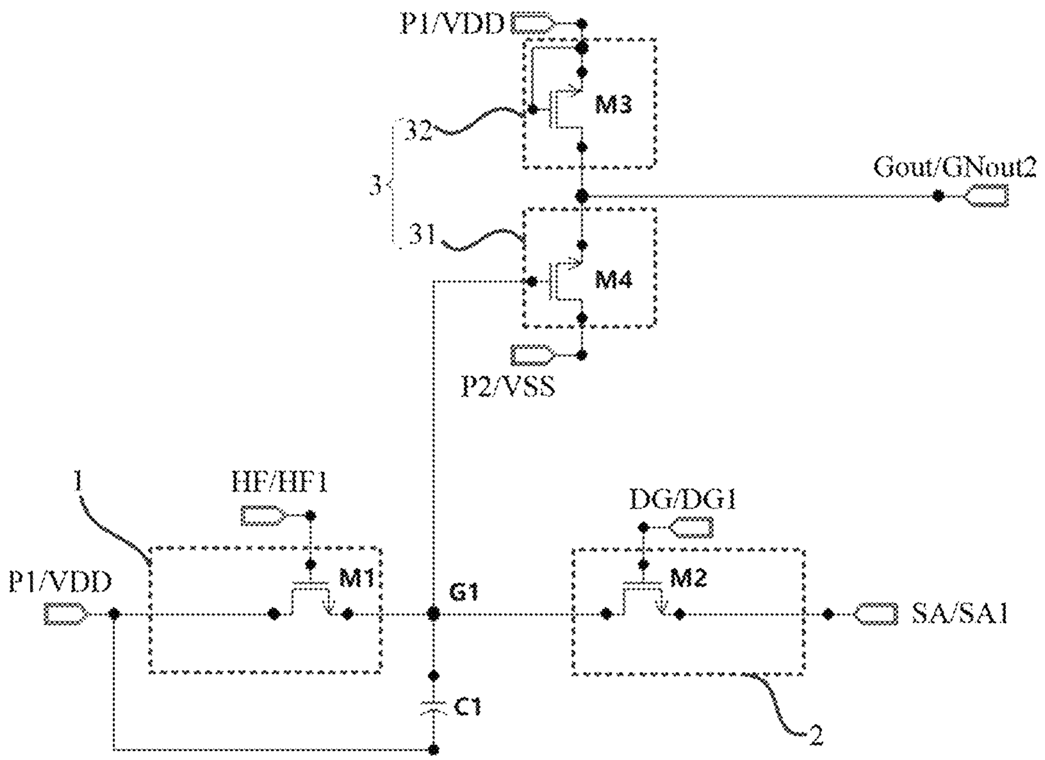
FIG. 6 is a schematic diagram of a second circuit structure of a signal generation circuit provided by an embodiment of the present disclosure.
Figure 7:
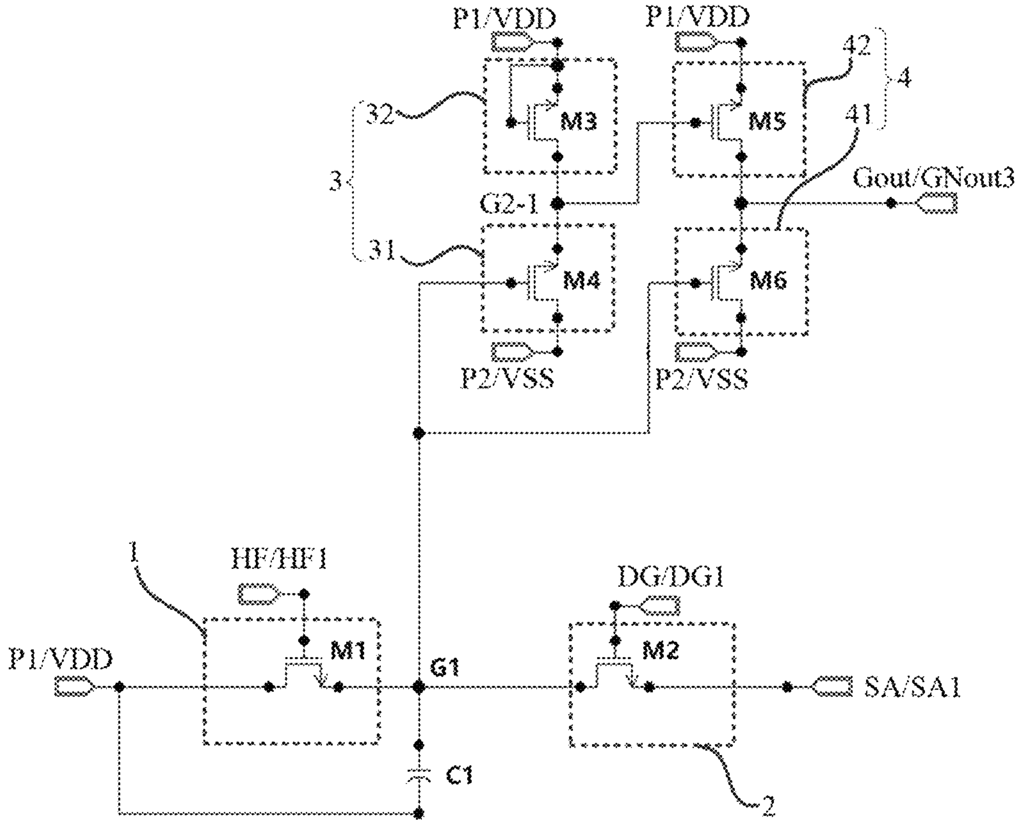
FIG. 7 is a schematic diagram of a third circuit structure of a signal generation circuit provided by an embodiment of the present disclosure.
Figure 9:
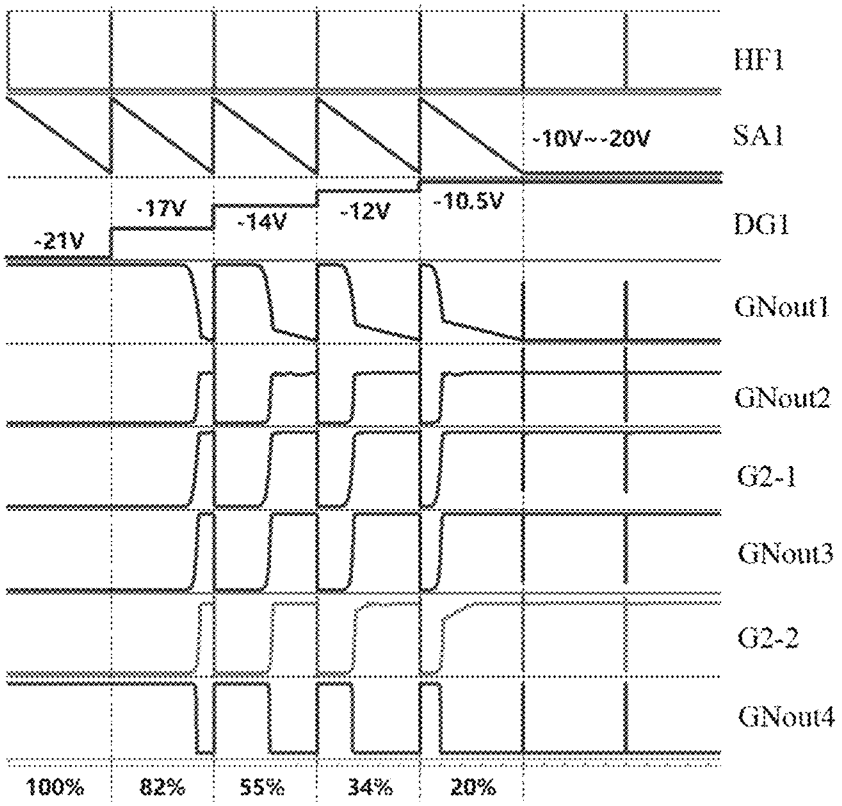
FIG. 9 is a schematic diagram of first working timing of a signal generation circuit provided by an embodiment of the present disclosure.

As shown in FIG. 5 to FIG. 7, the signal generation circuit is implemented by using N-type transistors, and corresponding timing of each signal is shown in FIG. 9. In this case, a VDD signal is inputted to the first level signal input terminal P1, a VSS signal is inputted to the second level signal input terminal P2, an analog signal is inputted to the analog signal input terminal SA1, and a level value of the analog signal varies from −10 V to −20 V within one cycle. The data voltage value of the adjustable data signal in each cycle can be adjusted to any value as needed. The specific working process of the signal generation circuit will be explained below in detail by taking an example that the data voltage value of the signal is as follows: −21 V, −17 V, −14 V, −12 V, −10.5 V.

For example, the control signal inputted to the control signal input terminal HF1 has the following parameters: a frequency of 2000 Hz, one cycle of 500 us, a duty cycle of (15V/−20V)=1/499 us, where 15 V represents a voltage value at which the control signal is at a high level, −20 V represents the voltage value at which the control signal is at a low level. The analog signal inputted to the analog signal input terminal SA1 has the following parameters: a frequency of 2000 Hz, a voltage variation range of −10V∼−20V within one cycle. The VSS signal includes a DC signal of −10V. The VDD signal includes a DC signal of 10V.

As shown in FIG. 5 and FIG. 9, the first transistor M1 is turned on by the control signal inputted to the control signal input terminal HF1 at the beginning of each cycle, to reset the target signal outputted by the target output terminal GNout1 to be the VDD signal. The gate-source voltage Vgs of the second transistor M2 is equal to a difference between the data voltage value of the adjustable data signal inputted to the adjustable data signal input terminal DG1 and a voltage value of the analog signal inputted to the analog signal input terminal SA1. In the case where Vgs<Vth, Vth being a threshold voltage of the second transistor M2, the second transistor M2 is turned off, and the target signal outputted by the target output terminal GNout1 remains a high level. In the case where Vgs>Vth, the second transistor M2 is turned on, and the analog signal is transmitted to the target output terminal GNout1, and the potential of the target signal becomes a low level. The case where Vgs<Vth corresponds to the first level output phase, and the case where Vgs>Vth corresponds to the second level output phase.

As shown in FIG. 9, when the data voltage value is −21V and Vgs=−11V∼−1V<Vth, the second transistor M2 is always turned off, the target signal outputted by the target output terminal GNout1 remains a high level, and the duty cycle of the target signal is 100%. When the data voltage value is −17V and Vgs=−7V∼3V, in a region −7V∼Vth, the second transistor M2 is turned off, and the target signal outputted by the target output terminal GNout1 is at a high potential; in a region Vth∼3V, the second transistor M2 is turned on, and the analog signal is transmitted to the target output terminal GNout1, the potential of the target signal becomes a low level, and the duty cycle of the target signal is 82%. Similarly, when the data voltage value is −14V, −12V, −10.5V, the duty cycles of the target signal are 55%, 34%, and 20%, respectively. In summary, the cycle of the target signal is determined by the control signal input terminal HF1 and the analog signal input terminal SA1, and the duty cycle is determined by the adjustable data signal input terminal DG1.

Although the target signal with the adjustable duty cycle is achieved in the above embodiment, due to the gradual change of the analog signal inputted by the analog signal input terminal SA1, a change speed of the Vgs of the second transistor M2 is consistent with that of the analog signal, which leads to slow turn-on of the second transistor M2 and slow transmission of the analog signal to the target output terminal GNout1, resulting in a large Tf of the target signal. At the same time, the low-voltage part of the target signal is a gradually changing analog signal, which is not a stable DC signal and has poor stability.

Furthermore, as shown in FIG. 6 and FIG. 9, the third transistor M3 and the fourth transistor M4 are added. The third transistor M3 is controlled to be in a normally open state by the VDD signal, and an output signal of the output control node G1 is written to a gate electrode of the fourth transistor M4. When the output control node G1 outputs the VDD signal, the fourth transistor M4 is turned on, the target output terminal GNout2 outputs the VSS signal according to the voltage division principle of circuits in series. When the output control node G1 outputs the analog signal, the fourth transistor M4 is turned off, and the target output terminal GNout2 outputs the VDD signal. In one aspect, when the output signal of the output control node G1 drops to around −10V, the fourth transistor M4 is basically turned off, the VDD signal is written to the target output terminal GNout2 through the third transistor M3, the target signal is a high level signal, and there is no need to wait for the output signal of the output control node G1 to further decrease, thereby greatly reducing the Tr of the target signal. In another aspect, after the output signal of the output control node G1 drops to below −10V, the fourth transistor M4 remains turned off, and the target output terminal GNout2 stably outputs the high voltage target signal, solving the problem that the target signal gradually changes.

However, in the above embodiments, in one aspect, when the target output terminal GNout2 outputs a target signal of a low level, both the third transistor M3 and the fourth transistor M4 are turned on, and due to the voltage division between the third transistor M3 and the fourth transistor M4, the voltage of the output target signal cannot be completely reduced to −10V voltage that is the same as the VSS signal. In the other aspect, the Tr of the target signal is still relatively large after improvement, and there is still room for further improvement.

More specifically, currents in the series circuit are the same at any position, and $$\text{current} = \frac{\text{voltage}}{\text{resistance}}.$$

Therefore, a ratio between a voltage across the third transistor M3 and a resistance of the third transistor M3 is equal to a ratio between a voltage across the fourth transistor M4 and a resistance of the fourth transistor M4. The voltage across the third transistor M3 is VDD−VGout, where Vdd is a voltage value of the VDD signal and VGout is the voltage value of the target output terminal. The voltage across the fourth transistor M4 is VGout−Vss, and VSS is a voltage value of the VSS signal. The equation $$\frac{Vdd - VGout}{VGout - Vss} = \frac{R3}{R4}$$

is satisfied, where R3 is the resistance of the third transistor M3, and R4 is the resistance of the fourth transistor M4.

The third transistor M3 is designed to have a small width-length ratio so that the resistance of the third transistor M3 is greater than that of the fourth transistor M4. As shown in the above equation, the higher the resistance of the third transistor M3 relative to the fourth transistor M4, the closer VGout relative to VSS.

It is assumed that VDD=10V and Vss=−10V, if the resistance of the third transistor M3 is 100 times that of the fourth transistor M4, the VGout voltage may be calculated as −9.8V; if the resistance of the third transistor M3 is 10 times that of the fourth transistor M4, the VGout voltage may be calculated as −8.2V.

There are two ways to adjust the resistance of the third transistor M3. In one aspect, the transistor size may be adjusted in the layout design (such as a width-length ratio W/L), and in the other aspect, a gate voltage of the transistor may be adjusted. If the gate voltage is low, the transistor is not fully turned on, and the resistance is high. Therefore, in voltage design, the gate voltage of the third transistor M3 may be minimized as much as possible, without affecting the circuit function.

The VDD signal inputted to the third transistor M3 is outputted to the target output terminal Gout, that is, for external use, so the specific voltage value of the signal may be determined according to the actual external requirement. The VDD signal inputted to the first transistor M1 is transmitted to the gate electrode of the fourth transistor M4, that is, for internal use. Therefore, the voltage value of the VDD signal inputted to the first transistor M1 may be set to be higher than the voltage value of the VDD signal inputted to the third transistor M3 by a voltage value ranging from 1 V to 10V, including endpoint values.

For example, the voltage value of the VDD signal inputted to the first transistor M1 is 15V, and the gate voltage of the fourth transistor M4 is 15V, which enables the fourth transistor M4 to be turned on more fully; the voltage value of the VDD signal inputted to the third transistor M3 is 10V, which enables the voltage value of the target signal outputted to the target output terminal Gout to be 10V.

Furthermore, as shown in FIG. 7 and FIG. 9, a fifth transistor M5 and a sixth transistor M6 are further added, and the output signal of the output control node G1 is simultaneously written into the fourth transistor M4 and the sixth transistor M6. A first electrode (corresponding to the G2-1 node) of the fourth transistor outputs a signal, and the signal is written into the fifth transistor M5. When a high level signal (i.e., VDD signal) is outputted by the output control node G1, the fourth transistor M4 and the sixth transistor M6 are turned on, the G2-1 node outputs a low level signal (i.e., VSS signal) to turn off the fifth transistor M5, and in this case, the target output terminal GNout3 outputs the VSS signal. When the analog signal is outputted by the output control node G1, the fourth transistor M4 and the sixth transistor M6 are turned off, the G2-1 node outputs a high level signal to turn on the fifth transistor M5, and the target output terminal GNout3 outputs the VDD signal. This method further lowers the low voltage output of the target output terminal GNout3 and improves the Tr of the target signal based on the secondary selection of the fifth transistor M5 and the sixth transistor M6.

Figure 10:
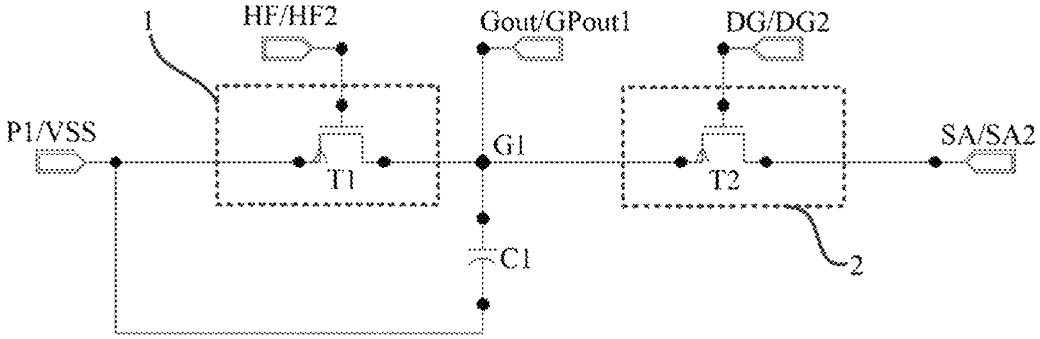
FIG. 10 is a schematic diagram of a fifth circuit structure of a signal generation circuit provided by an embodiment of the present disclosure.
Figure 11:
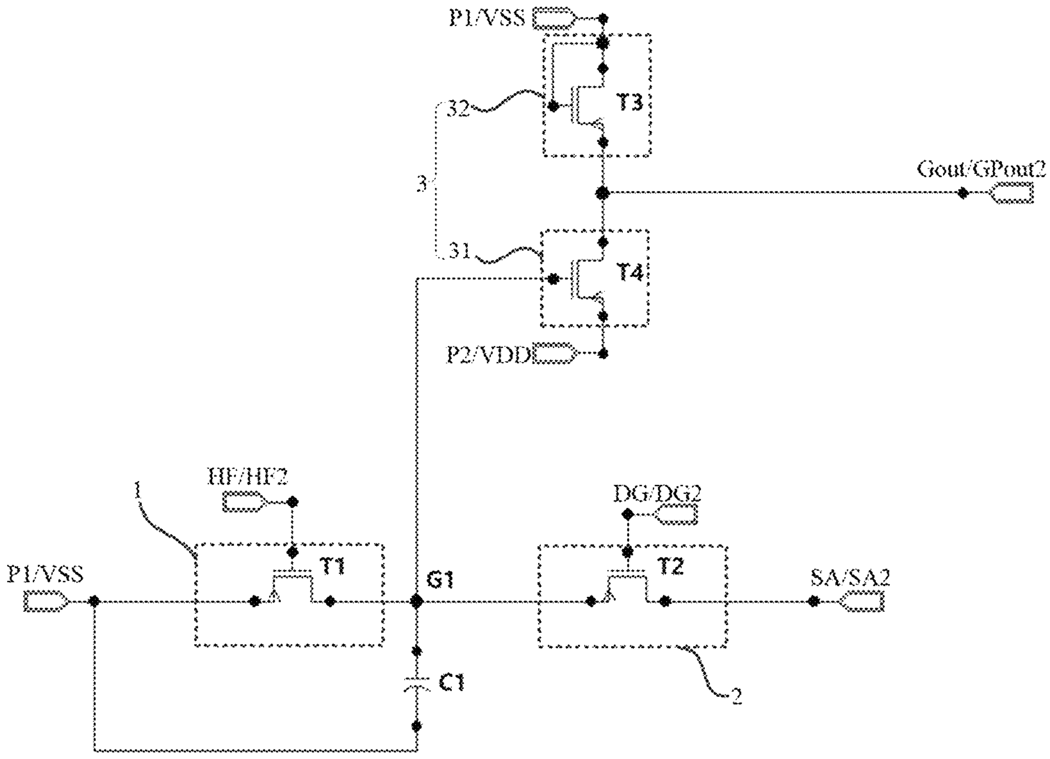
FIG. 11 is a schematic diagram of a sixth circuit structure of a signal generation circuit provided by an embodiment of the present disclosure.
Figure 12:
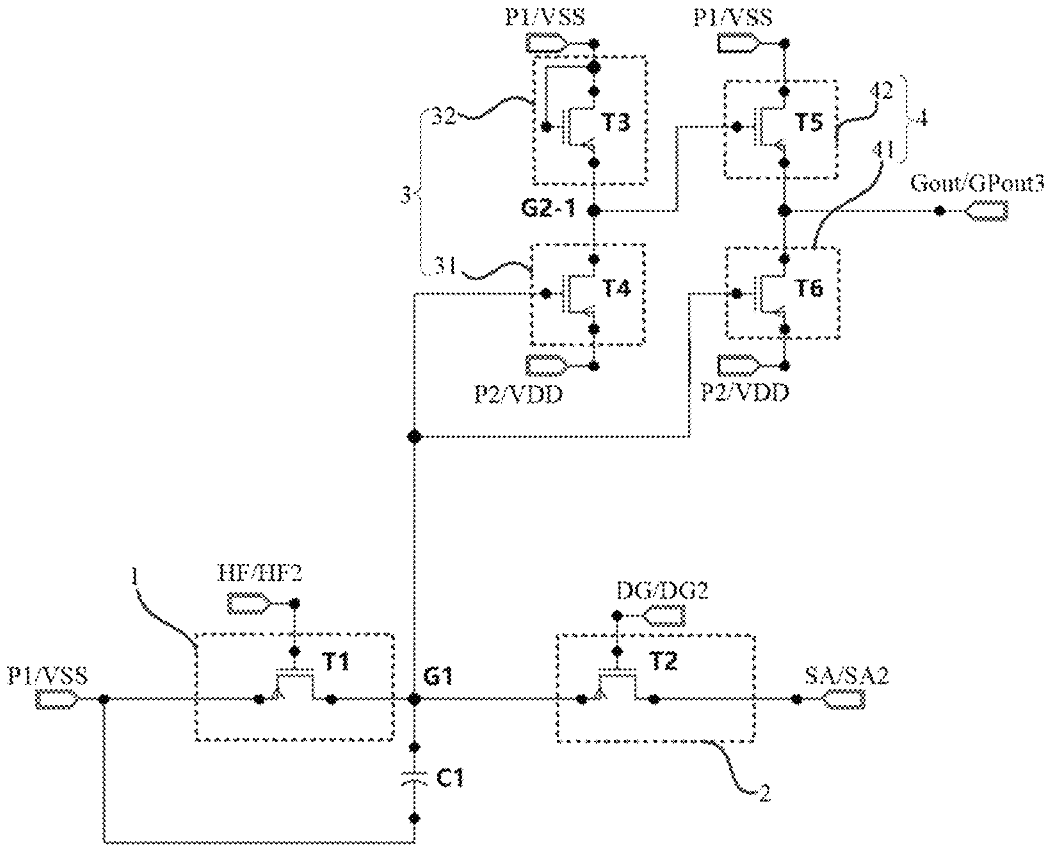
FIG. 12 is a schematic diagram of a seventh circuit structure of a signal generation circuit provided by an embodiment of the present disclosure.
Figure 14:
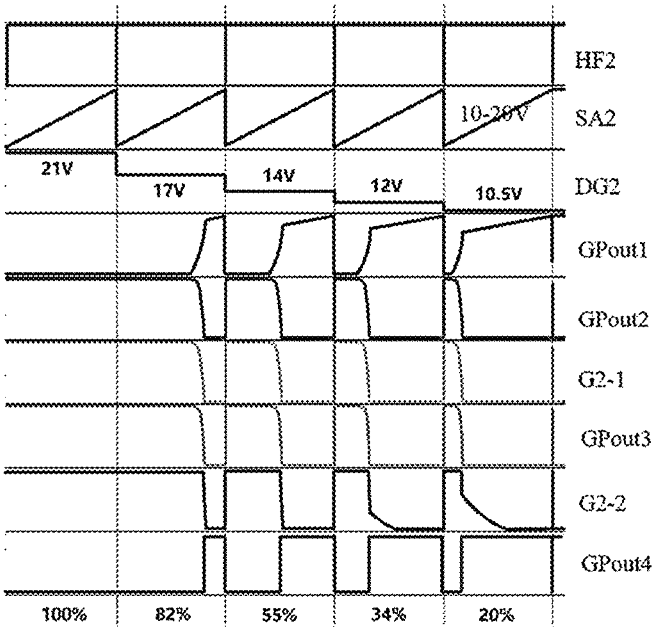
FIG. 14 is a schematic diagram of second working timing of a signal generation circuit provided by an embodiment of the present disclosure.

As shown in FIG. 10 to FIG. 12, the signal generation circuit is implemented by using P-type transistors, and a diagram showing corresponding timing of multiple signals is shown in FIG. 14. In this case, the first level signal input terminal P1 receives the VSS signal, the second level signal input terminal P2 receives the VDD signal, and the level value of the analog signal varies from 10 V to 20 V within one cycle. The data voltage value of the adjustable data signal in each cycle can be adjusted to any value as needed. The specific working process of the signal generation circuit will be explained below in detail by taking an example that the data voltage value of the signal is as follows: 21 V, 17 V, 14 V, 12 V, 10.5 V.

For example, the control signal inputted to the control signal input terminal HF2 has the following parameters: a frequency of 2000 Hz, one cycle of 500 us, a duty cycle of (−15V/20V)=1/499 us, where −15V represents a voltage value at which the control signal is at a low level, and 20V represents a voltage value at which the control signal is at a high level. The analog signal inputted to the analog signal input terminal SA2 has the following parameters: a frequency of 2000 Hz, a voltage variation range of 10V~20V within one cycle. The VSS signal includes a DC signal of −10V. The VDD signal includes a DC signal of 10V.

As shown in FIG. 10 and FIG. 14, the first transistor T1 is turned on by the control signal inputted to the control signal input terminal HF2 at the beginning of each cycle, to reset the target signal outputted by the target output terminal GNout2 to be the VDD signal. The gate-source voltage Vgs of the second transistor T2 is equal to a difference between the data voltage value of the adjustable data signal inputted to the adjustable data signal input terminal DG2 and the voltage value of the analog signal inputted to the analog signal input terminal SA2. In the case where Vgs>Vth, Vth being a threshold voltage of the second transistor T2, the second transistor T2 is turned off, and the target signal outputted by the target output terminal GNout2 remains a low level. In the case where Vgs<Vth, the second transistor T2 is turned on, and the analog signal is transmitted to the target output terminal GNout2, and the potential of the target signal becomes a high level. The case where Vgs>Vth corresponds to the first level output phase, and the case where Vgs<Vth corresponds to the second level output phase.

As shown in FIG. 14, when the data voltage value is 21V and Vgs=11V~1V>Vth, the second transistor T2 is always turned off, and the target signal outputted by the target output terminal GNout2 remains a high level with a duty cycle of 100%. When the data voltage value is 17V and Vgs=7V~−3V, in a phase where Vgs is in a range 7V~Vth, the second transistor T2 is turned off, and the target signal outputted by the target output terminal GNout2 is at a low level; in a phase where Vgs is in a range Vth~−3V, the second transistor T2 is turned on, and the analog signal is transmitted to the target output terminal GNout2, the potential of the target signal becomes a high level, and the duty cycle of the target signal is 82%. Similarly, when the data voltage value is 14V, 12V, 10.5V, the duty cycles of the target signal are 55%, 34%, and 20%, respectively. In summary, the cycle of the target signal is determined by the control signal input terminal HF2 and the analog signal input terminal SA2, and the duty cycle is determined by the adjustable data signal input terminal DG2.

Although the target signal with the adjustable duty cycle is achieved in the above embodiment, due to the gradual change of the analog signal inputted by the analog signal input terminal SA2, a change speed of the Vgs of the second transistor T2 is consistent with that of the analog signal, which leads to slow turn-on of the second transistor T2 and slow transmission of the analog signal to the target output terminal GNout2, resulting in a large Tf of the target signal. At the same time, the high-voltage part of the target signal is a gradually changing analog signal, which is not a stable DC signal and has poor stability.

Furthermore, as shown in FIG. 11 and FIG. 14, the third transistor T3 and the fourth transistor T4 are added. The third transistor T3 is controlled to be in a normally open state by the VSS signal, and an output signal of the output control node G1 is written to a gate electrode of the fourth transistor T4. When the output control node G1 outputs the VSS signal, the fourth transistor T4 is turned on, the target output terminal GNout2 outputs the VDD signal according to the voltage division principle of circuits in series. When the output control node G1 outputs the analog signal, the fourth transistor T4 is turned off, and the target output terminal GNout2 outputs the VSS signal. In one aspect, when the output signal of the output control node G1 rises to around 10V, the fourth transistor T4 is basically turned off, the VSS signal is written to the target output terminal GNout2 through the third transistor T3, the target signal is a low level signal, and there is no need to wait for the output signal of the output control node G1 to further increase, thereby greatly reducing the Tr of the target signal. In another aspect, after the output signal of the output control node G1 rises to below 10V, the fourth transistor T4 remains turned off, and the target output terminal GNout2 stably outputs the low voltage target signal, solving the problem that the target signal gradually changes.

However, in the above embodiments, in one aspect, when the target output terminal GNout2 outputs a target signal of a high level, both the third transistor T3 and the fourth transistor T4 are turned on, and due to the voltage division between the third transistor T3 and the fourth transistor T4, the voltage of the output target signal cannot be completely increased to 10V voltage that is the same as the VSS signal. In the other aspect, the Tr of the target signal is still relatively large after improvement, and there is still room for further improvement.

More specifically, reference can be made to the above detailed description of the principle of the N-type transistors, the VSS signal inputted to the third transistor T3 is outputted to the target output terminal Gout, that is, for external use, so the specific voltage value of the signal may be determined according to the actual external requirement. The VSS signal inputted to the first transistor T1 is transmitted to the gate electrode of the fourth transistor T4, that is, for internal use. Therefore, the voltage value of the VSS signal inputted to the first transistor T1 may be set to be lower than the voltage value of the VSS signal inputted to the third transistor T3.

For example, the voltage value of the VSS signal inputted to the first transistor T1 is −15V, and the gate voltage of the fourth transistor T4 is −15V, which enables the fourth transistor T4 to be turned on more fully; the voltage value of the VSS signal inputted to the third transistor T3 is −10V, which enables the voltage value of the target signal outputted to the target output terminal Gout to be −10V.

The principle of setting the signal voltage value in the case where P-type transistors are used is essentially the same as the principle of setting the signal voltage value in the case where N-type transistors are used. Thus, in the actual adjustment of the resistance value and the voltage value of the signal, reference can be made to the principle of N-type transistors, which will not be repeated here.

Furthermore, as shown in FIG. 12 and FIG. 14, a fifth transistor T5 and a sixth transistor T6 are further added, and the output signal of the output control node G1 is simultaneously written into the fourth transistor T4 and the sixth transistor T6. The output signal of a first electrode (corresponding to the G2-1 node) of the fourth transistor is written into the fifth transistor T5. When a low level signal (i.e., VSS signal) is outputted by the output control node G1, the fourth transistor T4 and the sixth transistor T6 are turned on, the G2-1 node outputs a high level signal (i.e., VDD signal) to turn off the fifth transistor T5, and in this case, the target output terminal GPout3 outputs the VDD signal. When the analog signal is outputted by the output control node G1, the fourth transistor T4 and the sixth transistor T6 are turned off, the G2-1 node outputs a low level signal to turn on the fifth transistor T5, and the target output terminal GPout3 outputs the low voltage signal of VSS. This method further lowers the low voltage outputted by the target output terminal GNout3 and improves the Tr of the target signal based on the secondary selection of the fifth transistor T5 and the sixth transistor T6.

Figure 4:
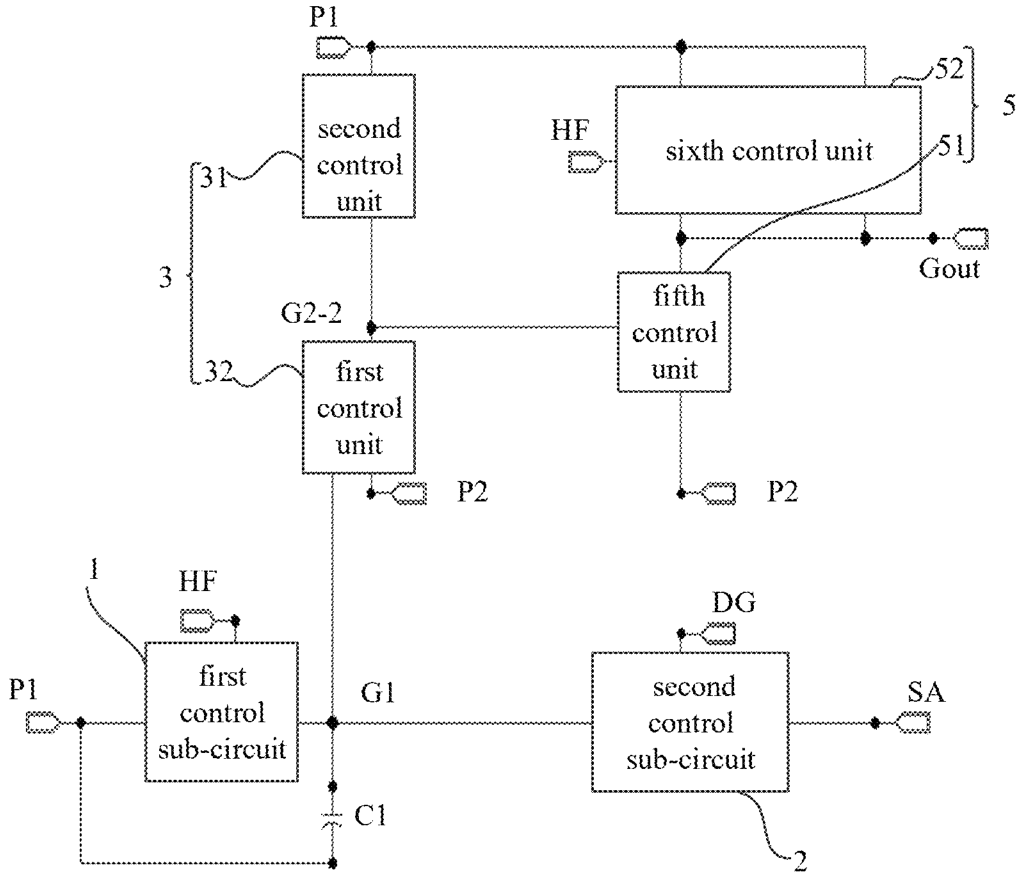
FIG. 4 is a schematic diagram of a fourth module of a signal generation circuit provided by an embodiment of the present disclosure.

As shown in FIG. 4, in some embodiments, the signal generation circuit further includes: a second output compensation sub-circuit 5, the third terminal of the first control unit 31 and the third terminal of the second control unit 32 are coupled to form a G2-2 node, and are coupled to the target output terminal Gout through the second output compensation sub-circuit 5; the second output compensation sub-circuit 5 is further coupled to the control signal input terminal HF, the first level signal input terminal P1, and the second level signal input terminal P2.

The second output compensation sub-circuit 5 is configured to control the electrical connection between the second level signal input terminal P2 and the target output terminal Gout to be turned on or turned off under the control of the third terminal (i.e., G2-2 node) of the first control unit 31; and is further configured to control the electrical connection between the first level signal input terminal P1 and the target output terminal Gout to be turned on or turned off under the control of the control signal input terminal HF.

In the first level output phase, the second output compensation sub-circuit 5 is configured to control the electrical connection between the second level signal input terminal P2 and the target output terminal Gout to be turned off under the control of the third terminal (i.e., G2-2 node) of the first control unit 31; the second output compensation sub-circuit 5 is further configured to control the electrical connection between the first level signal input terminal P1 and the target output terminal Gout to be turned on under the control of the control signal input terminal HF.

In the second level output phase, the second output compensation sub-circuit 5 is configured to control the electrical connection between the second level signal input terminal P2 and the target output terminal Gout to be turned on under the control of the third terminal (i.e., G2-2 node) of the first control unit 31; the second output compensation sub-circuit 5 is further configured to control the electrical connection between the first level signal input terminal P1 and the target output terminal Gout to be turned off under the control of the control signal input terminal HF.

As shown in FIG. 4, for example, the second output compensation sub-circuit 5 includes: a fifth control unit 51 and a sixth control unit 52; the fifth control unit 51 is coupled to the third terminal (i.e., G2-2 node) of the first control unit 31, the second level signal input terminal P2, and the target output terminal Gout; is configured to control the electrical connection between the second level signal input terminal P2 and the target output terminal Gout to be turned on or turned off under the control of the third terminal (i.e., G2-2 node) of the first control unit 31; the sixth control unit 52 is coupled to the control signal input terminal HF, the first level signal input terminal P1, and the target output terminal Gout; is configured to control the electrical connection between the first level signal input terminal P1 and the target output terminal Gout to be turned on or turned off under the control of the control signal input terminal HF.

In the first level output phase, the fifth control unit 51 is configured to control the electrical connection between the second level signal input terminal P2 and the target output terminal Gout to be turned off under the control of the third terminal (i.e., G2-2 node) of the first control unit 31; the sixth control unit 52 is configured to control the electrical connection between the first level signal input terminal P1 and the target output terminal Gout to be turned on under the control of the control signal input terminal HF.

In the second level output phase, the fifth control unit 51 is configured to control the electrical connection between the second level signal input terminal P2 and the target output terminal Gout to be turned on under the control of the third terminal (i.e., G2-2 node) of the first control unit 31; The sixth control unit 52 is configured to control the electrical connection between the first level signal input terminal P1 and the target output terminal Gout to be turned off under the control of the control signal input terminal HF.

By setting the signal generation circuit to include the output control sub-circuit 3 and the second output compensation sub-circuit 5, the fifth control unit 51 can turn on the electrical connection between the second level signal input terminal P2 and the target output terminal Gout when the potential of the target signal is controlled to be a second level, and the sixth control unit 52 can turn off the electrical connection between the first level signal input terminal P1 and the target output terminal Gout. Therefore, the potential of the target signal is the voltage division between the first control unit 31 and the second control unit 32, and the potential of the target signal can fully reach the second level. Moreover, this setting method further improves the Tf (falling time) or Tr (rising time) of the target signal.

Figure 8:
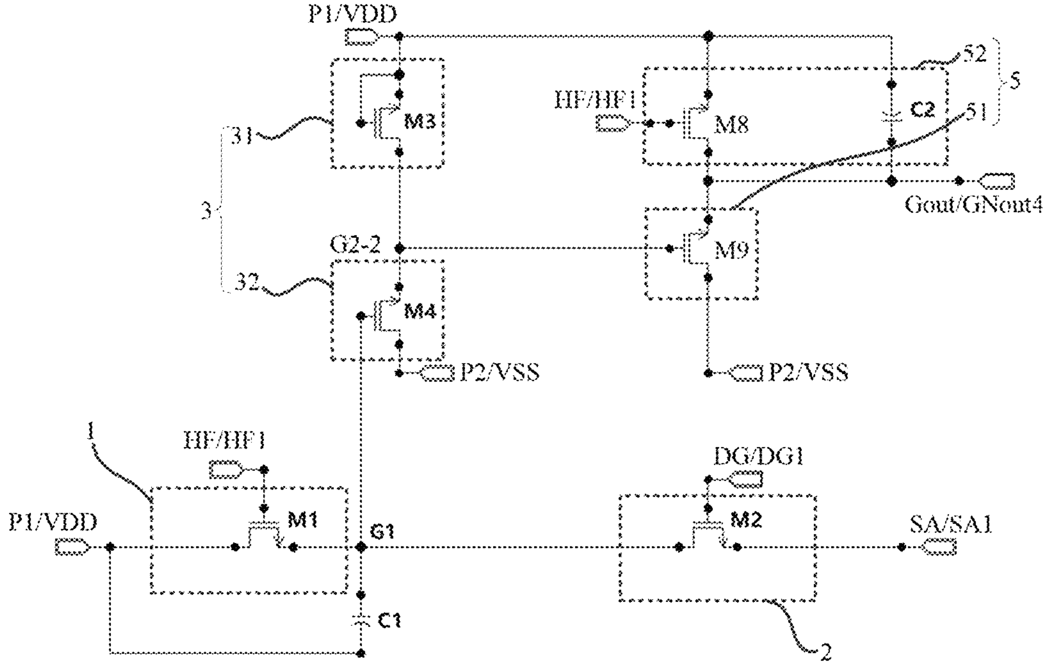
FIG. 8 is a schematic diagram of a fourth circuit structure of a signal generation circuit provided by an embodiment of the present disclosure.
Figure 13:
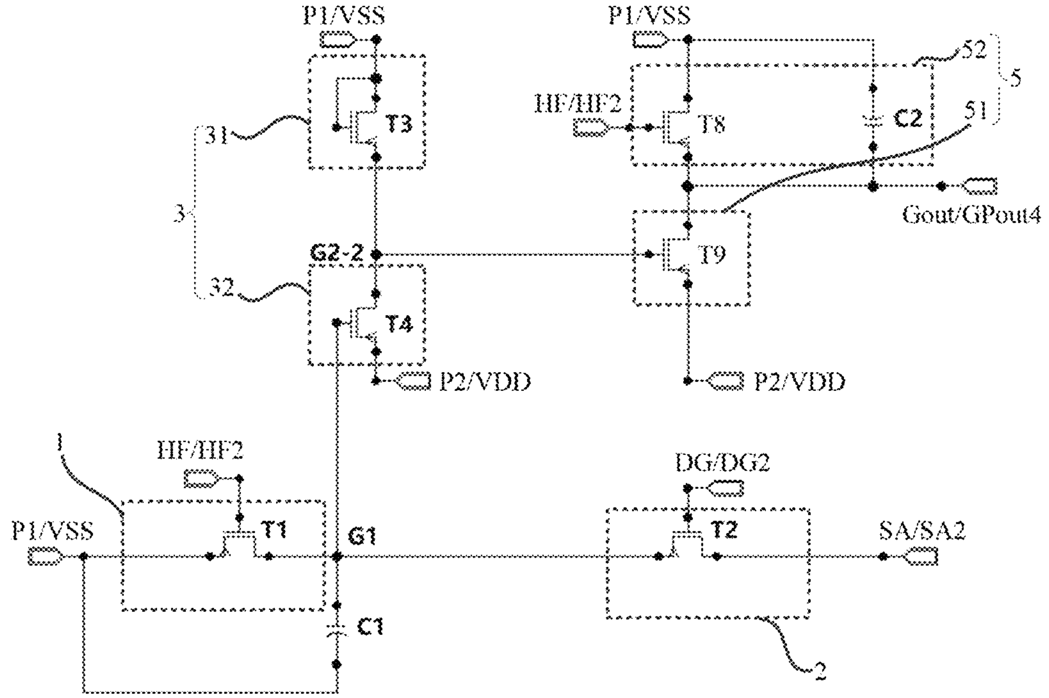
FIG. 13 is a schematic diagram of an eighth circuit structure of a signal generation circuit provided by an embodiment of the present disclosure.

As shown in FIG. 8 and FIG. 13, in some embodiments, the first control sub-circuit 1 includes a first transistor (such as M1 and T1), a gate electrode of the first transistor is coupled to the control signal input terminal HF, a first electrode of the first transistor is coupled to the first level signal input terminal P1, and a second electrode of the first transistor is coupled to the output control node G1.

The second control sub-circuit 2 includes a second transistor (such as M2 and T2), a gate electrode of the second transistor is coupled to the adjustable data signal input terminal DG, a first electrode of the second transistor is coupled to the analog signal input terminal SA, and a second electrode of the second transistor is coupled to the output control node G1.

The second control unit 32 includes a third transistor (such as M3 and T3), a gate electrode of the third transistor and a second electrode of the third transistor are both coupled to the first level signal input terminal P1.

The first control unit 31 includes a fourth transistor (such as M4 and T4), a gate electrode of the fourth transistor is coupled to the output control node G1, a first electrode of the fourth transistor is coupled to the first electrode of the third transistor, and a second electrode of the fourth transistor is coupled to the second level signal input terminal P2.

The sixth control unit 52 includes an eighth transistor (such as M8, T8) and a second capacitor C2; a gate electrode of the eighth transistor is coupled to the control signal input terminal HF, a first electrode of the eighth transistor is coupled to the first level signal input terminal P1, and a second electrode of the eighth transistor is coupled to the target output terminal Gout; a first electrode plate of the second capacitor C2 is coupled to the first level signal input terminal P1, and a second electrode plate of the second capacitor C2 is coupled to the target output terminal Gout; the second capacitor C2 has a storage function.

The fifth control unit 51 includes a ninth transistor (such as M9 and T9), a gate electrode of the ninth transistor is coupled to the first electrode of the fourth transistor, a first electrode of the ninth transistor is coupled to the second level signal input terminal P2, and a second electrode of the ninth transistor is coupled to the target output terminal Gout.

As shown in FIG. 8, the signal generation circuit is implemented by using N-type transistors, and a diagram showing the corresponding timing of each signal is shown in FIG. 9. In this case, the first level signal input terminal P1 receives a VDD signal, the second level signal input terminal P2 receives a VSS signal, and a level value of the analog signal varies from −10 V to −20 V within one cycle. The data voltage value of the adjustable data signal in each cycle can be adjusted to any value as needed. The specific working process of the signal generation circuit will be explained below in detail by taking an example that the data voltage value of the signal is as follows: −21 V, −17 V, −14 V, −12 V, −10.5 V.

As shown in FIG. 8 and FIG. 9, an eighth transistor M8 and a ninth transistor M9 and a second capacitor C2 are added. At the beginning of one cycle, the first transistor M1 and the eighth transistor M8 are turned on by the control signal input terminal HF1, and the VDD signal is written to the output control node G1 and the target output terminal GNout4. The target output terminal GNout4 outputs the VDD signal, and the fourth transistor M4 is turned on due to the output control node G1. The first electrode (corresponding to the G2-2 node) of the fourth transistor outputs a low level signal to turn off the ninth transistor M9, and the target signal outputted by the target output terminal GNout4 maintains the VDD signal. When an analog signal is outputted from the output control node G1, the fourth transistor M4 is turned off, the G2-2 node outputs a high level signal to turn on the ninth transistor M9, and the VSS signal is written to the target output terminal GNout4, where the target output terminal GNout4 outputs the VSS signal. This method completely solves the problem of insufficient low voltage outputted at the target output terminal, while further reducing Tf.

It is worth noting that in the embodiment shown in FIG. 8, after the control signal is inputted to the control signal input terminal HF1, the output control node G1 is at a high level to turn on the fourth transistor M4, and the VDD signal and VSS signal are transmitted through the third transistor M3 and the fourth transistor M4 that are turned on. By adjusting the parameter such as the width-length ratio of the transistor, a resistance of the third transistor M3 is greater than that of the fourth transistor M4, and according to the voltage division principle of the series circuit, the voltage at the G2-2 node is at a low level. When a ratio of the resistance of the third transistor M3 relative to the resistance of the fourth transistor M4 increases, or the voltage of the VSS signal inputted to the fourth transistor M4 decreases, the voltage at the G2-2 node decreases. Therefore, the potential of the VSS signal received by the fourth transistor M4 may be set to −14V to ensure that the voltage at the G2-2 node is less than or equal to the −10V VSS signal connected to other transistors, thereby ensuring that the ninth transistor M9 is turned off and the target output terminal GNout4 outputs a high level signal.

As shown in FIG. 13, the signal generation circuit is implemented by using P-type transistors, and a diagram showing corresponding timing of each signal is shown in FIG. 14. In this case, the first level signal input terminal P1 receives the VSS signal, and the second level signal input terminal P2 receives the VDD signal. The level value of the analog signal varies from 10V to 20V within one cycle. The data voltage value of the adjustable data signal in each cycle can be adjusted to any value as needed. The specific working process of the signal generation circuit will be explained below in detail by taking an example that the data voltage value of the signal is as follows: 21 V, 17 V, 14 V, 12 V, 10.5 V.

As shown in FIG. 13 and FIG. 14, an eighth transistor T8 and a ninth transistor T9 and a second capacitor C2 are added. At the beginning of one cycle, the first transistor T1 and the eighth transistor T8 are turned on by the control signal input terminal HF2, and the VSS signal is written to the output control node G1 and the target output terminal GPout4. The target output terminal GPout4 outputs the VSS signal, and the fourth transistor T4 is turned on due to the output control node G1. The first electrode (corresponding to the G2-2 node) of the fourth transistor outputs a high level signal to turn off the ninth transistor T9, and the target signal outputted by the target output terminal GPout4 maintains the VSS signal. When an analog signal is outputted from the output control node G1, the fourth transistor T4 is turned off, the G2-2 node outputs a high level signal to turn on the ninth transistor T9, and the VDD signal is written to the target output terminal GPout4, where the target output terminal GPout4 outputs the VDD signal. This method completely solves the problem of insufficient low voltage outputted at the target output terminal, while further reducing Tf.

It is worth noting that in the embodiment shown in FIG. 13, after the control signal is inputted to the control signal input terminal HF2, the output control node G1 is at a low level to turn on the fourth transistor T4, and the VDD signal and VSS signal are transmitted through the conducted third transistor T3 and the conducted fourth transistor T4. By adjusting the parameter such as the width-length ratio of the transistor, a resistance of the third transistor T3 is greater than that of the fourth transistor T4, and according to the voltage division principle of the series circuit, the voltage at the G2-2 node is at a high level. When a ratio of the resistance of the third transistor T3 relative to the fourth transistor T4 increases, or the voltage of the VDD signal inputted to the fourth transistor T4 increases, the voltage at the G2-2 node increases. Therefore, the potential of the VDD signal received by the fourth transistor T4 may be set to 14V to ensure that the voltage at the G2-2 node is greater than or equal to the 10V VDD signal connected to other transistors, thereby ensuring that the ninth transistor T9 is turned off and the target output terminal GPout4 outputs a low level signal.

As shown in FIG. 15, in some embodiments, the output control sub-circuit 3 is configured to control the electrical connection between the second level signal input terminal P2 and the target output terminal Gout to be turned on or turned off under the control of the output control node G1; is further configured to control the electrical connection between the first level signal input terminal P1 and the target output terminal Gout to be turned on or turned off under the control of the output control node G1.

In the first level output phase, the output control sub-circuit 3 is configured to control the electrical connection between the second level signal input terminal P2 and the target output terminal Gout to be turned on under the control of the output control node G1, and is further configured to control the electrical connection between the first level signal input terminal P1 and the target output terminal Gout to be turned off under the control of the output control node G1. In the second level output phase, the output control sub-circuit 3 is configured to control the electrical connection between the second level signal input terminal P2 and the target output terminal Gout to be turned off under the control of the output control node G1, and is further configured to control the electrical connection between the first level signal input terminal P1 and the target output terminal Gout to be turned on under the control of the output control node G1.

As shown in FIG. 15, for example, the output control sub-circuit 3 includes a seventh control unit 33 and an eighth control unit 34; the seventh control unit 33 is coupled to the output control node G1, the second level signal input terminal P2, and the target output terminal Gout, and is configured to control the electrical connection between the second level signal input terminal P2 and the target output terminal Gout to be turned on or turned off under the control of the output control node G1; the eighth control unit 34 is coupled to the output control node G1, the first level signal input terminal P1, and the target output terminal Gout, and is configured to control the electrical connection between the first level signal input terminal P1 and the target output terminal Gout to be turned on or turned off under the control of the output control node G1.

In the first level output phase, the seventh control unit 33 is configured to control the electrical connection between the second level signal input terminal P2 and the target output terminal Gout to be turned on under the control of the output control node G1; the eighth control unit 34 is configured to control the electrical connection between the first level signal input terminal P1 and the target output terminal Gout to be turned off under the control of the output control node G1.

In the second level output phase, the seventh control unit 33 is configured to control the electrical connection between the second level signal input terminal P2 and the target output terminal Gout to be turned off under the control of the output control node G1; the eighth control unit 34 is configured to control the electrical connection between the first level signal input terminal P1 and the target output terminal Gout to be turned on under the control of the output control node G1.

In the above setting, the output control sub-circuit 3 can control the target output terminal Gout to receive the second level signal inputted from the second level signal input terminal P2 under the control of the output control node G1, and can control the target output terminal Gout to receive the first level signal inputted from the first level signal input terminal P1 under the control of the first level signal input terminal PT. Therefore, when the potential of the output control node G1 reaches a certain threshold, the target signal outputted by the target output terminal Gout can be controlled to be the first level signal or the second level signal, without being affected by the gradual change of the analog signal, thereby alleviating the problem of large Tf (falling time) or Tr (rising time) of the target signal. Moreover, by controlling the target output terminal Gout to output the first level signal or the second level signal through the output control node G1, the high or low voltage part of the target signal is avoided from being a gradually changing analog signal, so as to enable the high or low voltage part of the target signal to be a stable DC signal with good stability.

Figure 16:
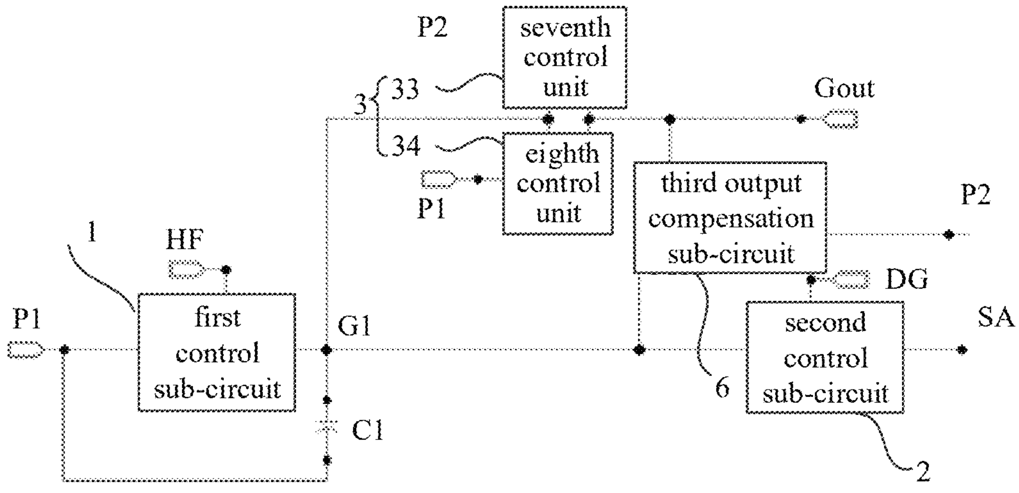
FIG. 16 is a schematic diagram of a sixth module of a signal generation circuit provided by an embodiment of the present disclosure.

As shown in FIG. 16, in some embodiments, the signal generation circuit further includes a third output compensation sub-circuit 6, which is coupled to the target output terminal Gout, the second level signal input terminal P2, and the output control node G1, and is configured to control the electrical connection between the second level signal input terminal P2 and the output control node G1 to be turned on or turned off under the control of the target output terminal Gout.

In the first level output phase, the third output compensation sub-circuit 6 controls the electrical connection between the second level signal input terminal P2 and the output control node G1 to be turned off under the control of the target output terminal Gout. In the second level output phase, the third output compensation sub-circuit 6 controls the electrical connection between the second level signal input terminal P2 and the output control node G1 to be turned on under the control of the target output terminal Gout.

When the above signal generation circuit is in operation, in the first level output phase, the seventh control unit 33 is turned on and the eighth control unit 34 is turned off, the target signal outputted by the target output terminal Gout is the second level signal, and the second level signal controls the third output compensation sub-circuit 6 to be turned off.

In the second level output phase, the second control sub-circuit 2 is turned on, to write the analog signal into the output control node G1, thereby controlling the seventh control unit 33 to be gradually turned off and the eighth control unit 34 to be gradually turned on, so that the target signal gradually becomes the first level signal. The first level signal controls the third output compensation sub-circuit 6 to be turned on, to quickly transmit the second level signal to the output control node G1. In this way, under the control of the output control node G1, the output control sub-circuit 3 can quickly turn off the electrical connection between the second level signal input terminal P2 and the target output terminal Gout, and quickly turn on the electrical connection between the first level signal input terminal P1 and the target output terminal Gout, ensuring the target signal outputted by the Gout terminal to quickly reach the first level signal. Due to the fact that in the second level output phase, the first level signal continuously controls the turned-on of the third output compensation sub-circuit 6 to assist the discharge of the output control node GT (i.e., the potential of the node discharges to the second level signal), the introduction of the third output compensation sub-circuit 6 can quickly change the potential of the output control node G1 to the second level, thereby solving the problem that the Tf (falling time) or Tr (rising time) of the signal of the output control node G1 is too large due to the slow gradient of the analog signal. Moreover, it better ensures that the target signal has good stability.

As shown in FIG. 17 to FIG. 22, in some embodiments, the first control sub-circuit 1 includes a first transistor (e.g., M1 and T1), a gate electrode of the first transistor is coupled to the control signal input terminal HF, a first electrode of the first transistor is coupled to the first level signal input terminal P1, and a second electrode of the first transistor is coupled to the output control node G1.

The second control sub-circuit 2 includes a second transistor (such as M2 and T2), a gate electrode of the second transistor is coupled to the adjustable data signal input terminal DG, a first electrode of the second transistor is coupled to the analog signal input terminal SA, and a second electrode of the second transistor is coupled to the output control node G1.

The seventh control unit 33 includes a tenth transistor (such as M10 and T10), a gate electrode of the tenth transistor is coupled to the output control node G1, a first electrode of the tenth transistor is coupled to the second level signal input terminal P2, and a second electrode of the tenth transistor is coupled to the target output terminal Gout.

The eighth control unit 34 includes an eleventh transistor (such as M11 and T11), a gate electrode of the eleventh transistor is coupled to the output control node GT, a first electrode of the eleventh transistor is coupled to the first level signal input terminal P1, and a second electrode of the eleventh transistor is coupled to the target output terminal Gout; one of the eleventh transistor and the tenth transistor is a P-type transistor, and the other is an N-type transistor.

As shown in FIG. 17 to FIG. 22, in some embodiments, the third output compensation sub-circuit 6 includes a twelfth transistor (such as M12 and T12), a gate electrode of the twelfth transistor is coupled to the target output terminal Gout, a first electrode of the twelfth transistor is coupled to the second level signal input terminal P2, and a second electrode of the twelfth transistor is coupled to the output control node G1.

Figure 17:
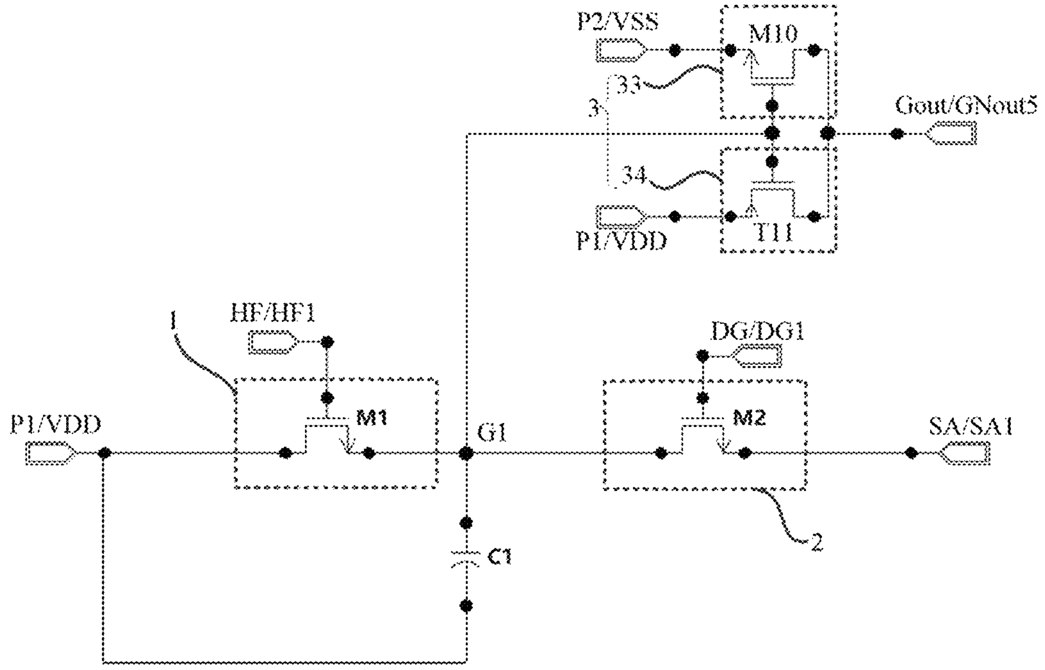
FIG. 17 is a schematic diagram of a ninth circuit structure of a signal generation circuit provided by an embodiment of the present disclosure.
Figure 18:
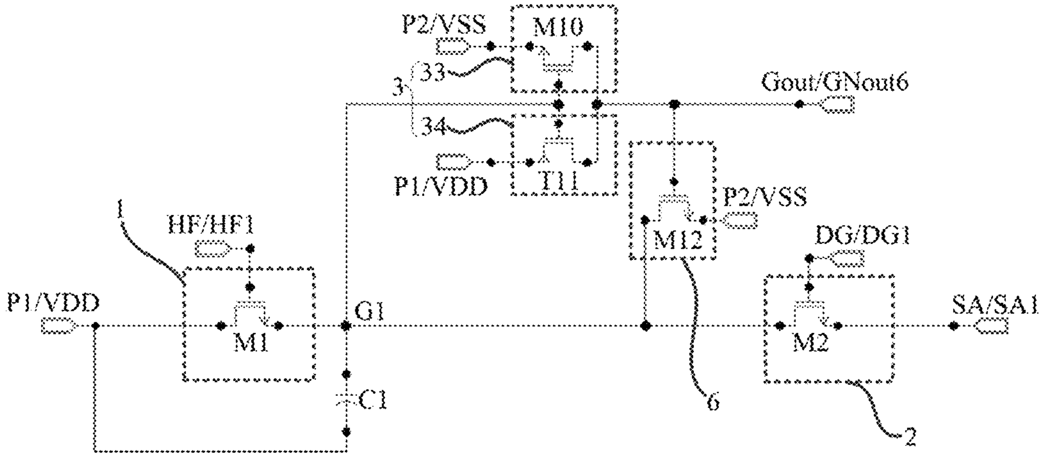
FIG. 18 is a schematic diagram of a tenth circuit of a signal generation circuit provided by an embodiment of the present disclosure.
Figure 19:
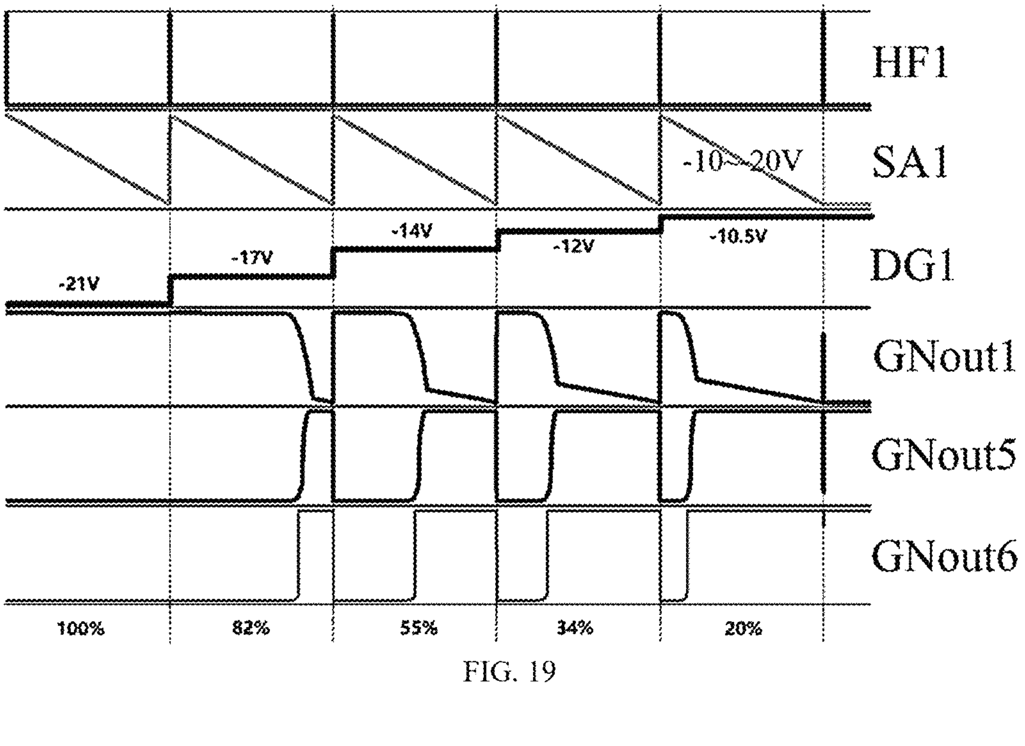
FIG. 19 is a schematic diagram of a third working timing of a signal generation circuit provided by an embodiment of the present disclosure.

As shown in FIG. 17 and FIG. 18, the first transistor M1, the second transistor M2, the tenth transistor M10, and the twelfth transistor M12 are implemented by using N-type transistors, and corresponding timing of each signal is shown in FIG. 19. In this case, the first level signal input terminal P1 receives the VDD signal, and the second level signal input terminal P2 receives the VSS signal. The level value of the analog signal varies from −10V to −20V within one cycle. The data voltage value of the adjustable data signal in each cycle can be adjusted to any value as needed. The specific working process of the signal generation circuit will be explained below in detail by taking an example that the data voltage value of the signal is as follows: −21 V, −17 V, −14 V, −12 V, −10.5 V.

As shown in FIG. 5 and FIG. 19, the control signal received by the control signal input terminal HF1 is turned on the first transistor M1 at the beginning of each cycle, to reset the target signal outputted by the target output terminal GNout1 to be the VDD signal. The gate-source voltage Vgs of the second transistor M2 is equal to a difference between the data voltage value of the adjustable data signal received by the adjustable data signal input terminal DG1 and a voltage value of the analog signal received by the analog signal input terminal SA1. In the case where Vgs<Vth, Vth being a threshold voltage of the second transistor M2, the second transistor M2 is turned off, and the target signal outputted by the target output terminal GNout1 remains a high level. In the case where Vgs>Vth, the second transistor M2 is turned on, and the analog signal is transmitted to the target output terminal GNout1, and the potential of the target signal becomes a low level. The case where Vgs<Vth corresponds to the first level output phase, and the case where Vgs>Vth corresponds to the second level output phase.

As shown in FIG. 19, when the data voltage value is −21V and Vgs=−11V~−1V<Vth, the second transistor M2 is always turned off, and the target signal outputted by the target output terminal GNout1 remains a high level with a duty cycle of 100%. When the data voltage value is −14V and Vgs=−4V~6V, in a region −7V~Vth, the second transistor M2 is turned off, and the target signal outputted by the target output terminal GNout1 is a high level; in a region Vth~6V, the second transistor M2 is turned on, the analog signal is written, and the target signal becomes a low level, and the duty cycle of the target signal is 55%.

Due to the gradual change of the analog signal input terminal SA1, a rising speed of the Vgs of the second transistor M2 is consistent with a falling speed of the analog signal, which leads to slow turn-on of the second transistor M2 and slow transmission of the analog signal to the target output terminal GNout1, resulting in a large Tf of the target signal. At the same time, the low-voltage part of the target signal is an analog signal of gradual change, which is not a stable DC signal and has poor stability.

Furthermore, as shown in FIG. 17 and FIG. 19, an N-type tenth transistor M10 and a P-type eleventh transistor T11 are added. After the cycle starts, the VDD signal is written through the first transistor M1, and the output control node G1 outputs a high level, to turn on tenth transistor M10 and to turn off the eleventh transistor M11. The VSS signal is written through the tenth transistor M10, and the target output terminal GNout5 outputs the VSS signal. In the case where Vgs>Vth, the second transistor M2 is turned on, the voltage of the output control node G1 slowly decreases to the voltage of the analog signal, the tenth transistor M10 is gradually turned off, and the eleventh transistor T11 is gradually turned on. When the voltage of the output control node G1 drops to about −10V (without waiting for the voltage of the output control node Gb to continue to drop), the tenth transistor M10 can be completely turned off, the VDD signal is written through the eleventh transistor T11, and the target output terminal GNout5 outputs the VDD signal. Compared to the Tf of the signal at the output control node G1, the Tr of the target signal is significantly reduced. Furthermore, the gate electrode of the eleventh transistor T11 is controlled by the output control node G1, and the voltage drop of the output control node G1 will not affect the output of the target output terminal GNout5, thus solving the problem of the unstable output of the target signal.

Furthermore, as shown in FIG. 18 and FIG. 19, an N-type twelfth transistor M12 is added. After the start of the cycle, the output control node G1 is at a high voltage, to turn on the tenth transistor M10 and to turn off the eleventh transistor T11; and the target output terminal GNout6 outputs a low voltage to turn off the twelfth transistor M12. When the second transistor M2 is turned on, and the analog signal is written to the output control node G1, the tenth transistor M10 is gradually turned off, the eleventh transistor T11 is gradually turned on, and the output voltage of the target output terminal GNout6 gradually increases, to gradually turn on the twelfth transistor M12. After the twelfth transistor M12 is turned on, the VSS signal is written to the output control node G1, to quickly reduce the voltage of the output control node G1 to the VSS signal. In this case, the tenth transistor M10 is turned off, and the eleventh transistor T11 is turned on, the VDD signal is written to the target output terminal GNout6, and the target output terminal GNout6 outputs a high level, so as to continuously turn on the twelfth transistor M12 to assist in discharging the output control node G1. After the twelfth transistor M12 is introduced, the voltage of the output control node G1 can be quickly lowered, thereby solving the problem that the Tf of the signal of the output control node G1 is too large due to the slow decrease of the analog signal, and the Tr deviation of the target signal outputted by the target output terminal GNout6 is large. At the same time, it ensures that the high voltage and the low voltage of the target signal outputted by GNout6 are stable, and the Tr and the Tf of the signal are relatively small.

Figure 20:
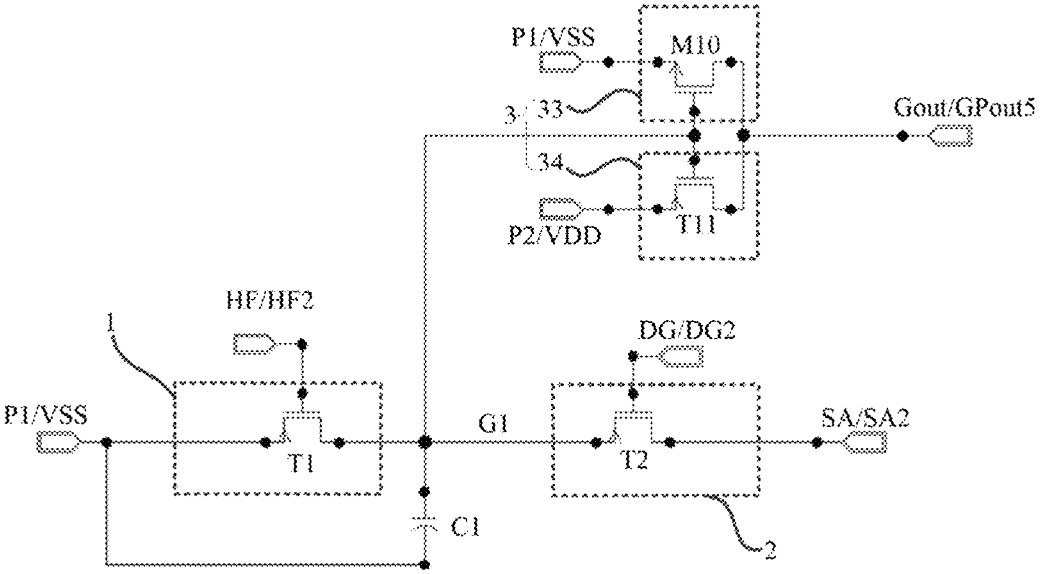
FIG. 20 is a schematic diagram of an eleventh circuit structure of a signal generation circuit provided by an embodiment of the present disclosure.
Figure 21:
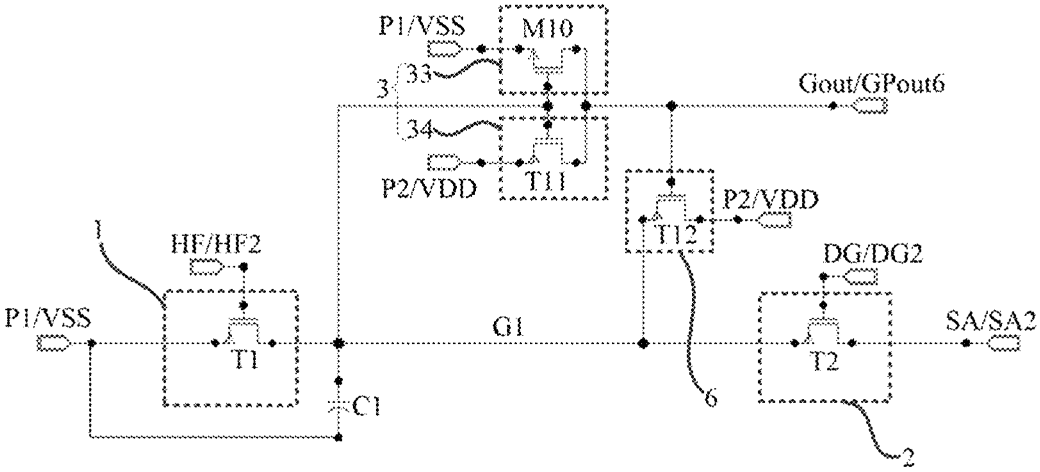
FIG. 21 is a schematic diagram of a twelfth circuit structure of a signal generation circuit provided by an embodiment of the present disclosure.
Figure 22:
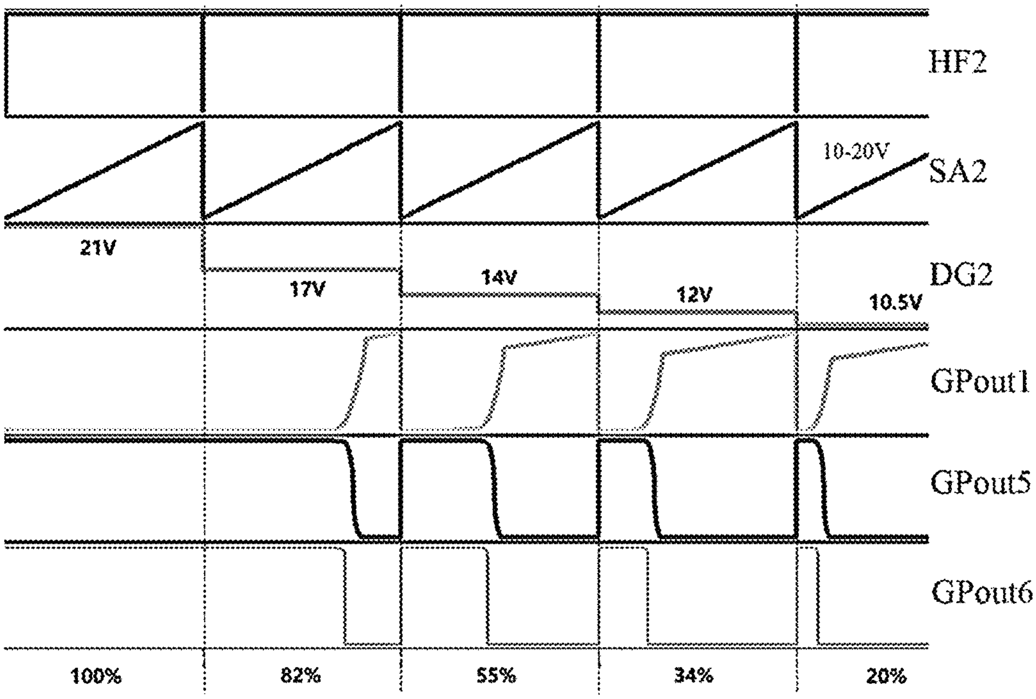
FIG. 22 is a schematic diagram of fourth working timing of a signal generation circuit provided by an embodiment of the present disclosure.

As shown in FIG. 20 and FIG. 21, the first transistor T1, the second transistor T2, the eleventh transistor T11, and the twelfth transistor T12 are implemented by using P-type transistors. The corresponding timing diagram of each signal are shown in FIG. 22. In this case, the first level signal input terminal P1 receives the VSS signal, and the second level signal input terminal P2 receives the VDD signal. The level value of the analog signal varies from 10V to 20V within one cycle. The data voltage value of the adjustable data signal in each cycle can be adjusted to any value as needed. The specific working process of the signal generation circuit will be explained below in detail by taking an example that the data voltage value of the signal is as follows: 21V, 17V, 14V, 12V, 10.5V.

As shown in FIG. 10 and FIG. 22, the first transistor T1 is turned on due to the control signal inputted to the control signal input terminal HF2 at the beginning of each cycle, to reset the target signal outputted by the target output terminal GNout2 to be the VDD signal. The gate-source voltage Vgs of the second transistor T2 is equal to a difference between the data voltage value of the adjustable data signal inputted to the adjustable data signal input terminal DG2 and the voltage value of the analog signal inputted to the analog signal input terminal SA2. In the case where Vgs>Vth, Vth being a threshold voltage of the second transistor T2, the second transistor T2 is turned off, and the target signal outputted by the target output terminal GNout1 remains a low level. In the case where Vgs<Vth, the second transistor T2 is turned on, and the analog signal is transmitted to the target output terminal GNout1, and the potential of the target signal becomes a high level. The case where Vgs>Vth corresponds to the first level output phase, and the case where Vgs<Vth corresponds to the second level output phase.

As shown in FIG. 22, when the data voltage value is 21V and Vgs=11V~1V>Vth, the second transistor T2 is turned off in the cycle, and the target signal outputted by the target output terminal GNout1 keeps a high level with a duty cycle of 100%. When the data voltage value is 14V and Vgs=4V~−6V, in a range 4V~Vth, the second transistor T2 is turned off, and the target signal outputted by the target output terminal GNout1 is at a low level; in a range Vth~−6V, the second transistor T2 is turned on, and the analog signal is transmitted to the target output terminal GNout1, the potential of the target signal becomes a high level, and the duty cycle of the target signal is 55%.

Although the target signal with the adjustable duty cycle is achieved in the above embodiment, due to the gradual change of the analog signal inputted by the analog signal input terminal SA2, a decrease speed of the Vgs of the second transistor T2 is consistent with that of the analog signal, which leads to slow turn-on of the second transistor T2 and slow transmission of the analog signal to the target output terminal GNout1, resulting in a large Tf of the target signal. At the same time, the high-voltage part of the target signal is a gradually changing analog signal, which is not a stable DC signal and has poor stability.

Furthermore, as shown in FIG. 20 and FIG. 22, an N-type tenth transistor M10 and a P-type eleventh transistor T11 are added. After the cycle starts, the VSS signal is written through the first transistor T1, and the output control node G1 outputs a low level, to turn off tenth transistor M10 and to turn on the eleventh transistor T11. The VDD signal is written through the eleventh transistor T11, and the target signal output terminal GPout5 outputs the VDD signal. When Vgs<Vth, the second transistor T2 is turned on, and the output control node G1 slowly rises to the analog signal, the tenth transistor M10 is gradually turned on, and the eleventh transistor T11 is gradually turned off. The tenth transistor M10 gradually is turned on, and the eleventh transistor T11 gradually is turned off. When the output control node G1 rises to about TOV (without waiting for the voltage of the output control node G1 to continue to rise), the eleventh transistor T11 can be completely turned off, the VSS signal is written through the tenth transistor M10, and the target signal output terminal GPout5 outputs the VSS signal. Compared with the Tr of the signal outputted by the control node G1, the Tf of the target signal output terminal GPout5 is significantly reduced. Furthermore, the gate electrode of the eleventh transistor T11 is controlled by the output control node G1, and the voltage rise of the output control node Gb will not affect the output of the target output terminal GNout5, thus solving the problem of the unstable output of the target signal.

Furthermore, as shown in FIG. 21 and FIG. 22, a P-type twelfth transistor T12 is added. After the cycle starts, the output control node Gb outputs a low level to turn on the eleventh transistor T11 and turn off the tenth transistor M10. The target signal output terminal GPout6 outputs a VDD signal to turn off the twelfth transistor T12. When the second transistor T2 is turned on and the analog signal is written to the output control node G1, the tenth transistor M10 is gradually turned off, the eleventh transistor T11 is gradually turned on, and the output voltage of the target output terminal GNout6 gradually increases, to gradually turn on the twelfth transistor M12. When the second transistor M2 is turned on, and the analog signal is written to the output control node G1, the tenth transistor M10 is gradually turned off, the eleventh transistor T11 is gradually turned on, and the output voltage of the target output terminal GNout6 gradually increases, to gradually turn on the twelfth transistor M12. After the twelfth transistor M12 is turned on, the VDD signal is written to the output control node G1, to quickly increase the voltage of the output control node G1 to a voltage that is the same as the VDD signal. In this case, the tenth transistor M10 is turned on, and the eleventh transistor T11 is turned off, the VSS signal is written to the target output terminal GNout6, and the target output terminal GNout6 outputs the VSS signal, so as to continuously turn on the twelfth transistor M12 to assist in discharging the output control node G1. After the twelfth transistor M12 is introduced, the voltage of the output control node G1 can be quickly increased, thereby solving the problem that the Tr of the signal of the output control node G1 is too large due to the slow increase of the analog signal, and the Tr deviation of the target signal outputted by the target output terminal GNout6 is large. At the same time, it ensures that the high voltage and the low voltage of the target signal outputted by GNout6 are stable, and the Tr and the Tf of the signal are relatively small.

In the signal generation circuit provided in the above embodiments, it is able to generate low-voltage signals with adjustable timing and high-voltage signals with adjustable timing, and to improve the high and low voltage stability of the signals, and the Tr and the Tf of the signals, so as to ensure that the output signal quality meets the requirements of the display field.

As shown in FIG. 5 and FIG. 10, in some embodiments, the first control sub-circuit 1 includes a first transistor (such as M1 and T1), a gate electrode of the first transistor is coupled to the control signal input terminal HF, a first electrode of the first transistor is coupled to the first level signal input terminal P1, and a second electrode of the first transistor is coupled to the output control node G1.

The second control sub-circuit 2 includes a second transistor (such as M2 and T2), a gate electrode of the second transistor is coupled to the adjustable data signal input terminal DG, a first electrode of the second transistor is coupled to the analog signal input terminal SA, and a second electrode of the second transistor is coupled to the output control node G1.

As shown in FIG. 6 and FIG. 11, in some embodiments, a gate electrode of the first transistor is coupled to the control signal input terminal HF, a first electrode of the first transistor is coupled to the first level signal input terminal P1, and a second electrode of the first transistor is coupled to the output control node G1.

The second control sub-circuit 2 includes a second transistor (such as M2 and T2), a gate electrode of the second transistor is coupled to the adjustable data signal input terminal DG, a first electrode of the second transistor is coupled to the analog signal input terminal SA, and a second electrode of the second transistor is coupled to the output control node G1.

The second control unit 32 includes a third transistor (such as M3 and T3), a gate electrode of the third transistor and a second electrode of the third transistor are both coupled to the first level signal input terminal P1.

The first control unit 31 includes a fourth transistor (such as M4 and T4), a gate electrode of the fourth transistor is coupled to the output control node G1, a first electrode of the fourth transistor is coupled to the first electrode of the third transistor, and a second electrode of the fourth transistor is coupled to the second level signal input terminal P2.

Figure 1:
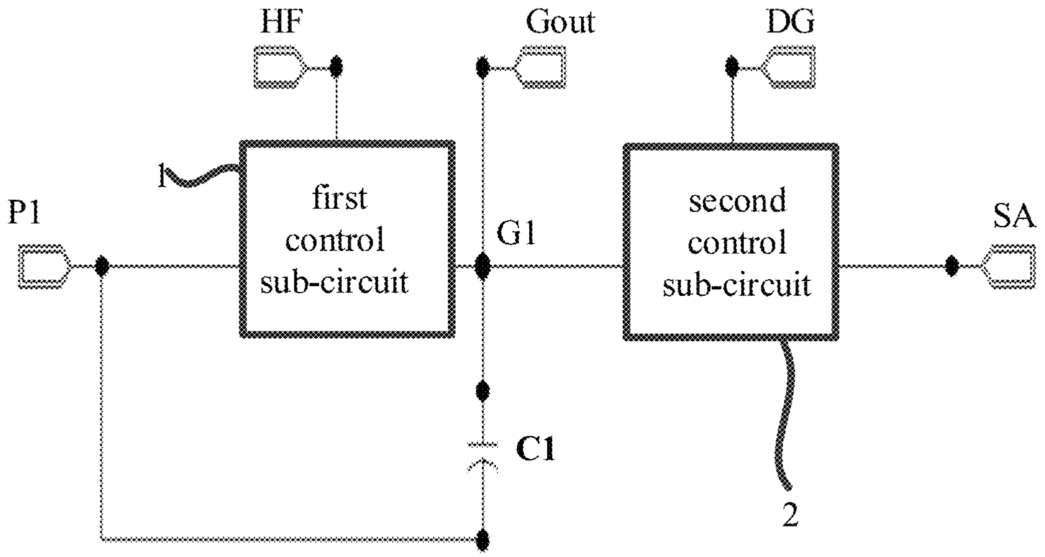
FIG. 1 is a schematic diagram of a first module of a signal generation circuit provided by an embodiment of the present disclosure.

As shown in FIG. 1, in some embodiments, the signal generation circuit further includes a capacitor structure C1 with storage function, where a first end of the capacitor structure C1 is coupled to the output control node G1, and a second end of the capacitor structure C1 is coupled to the first level signal input terminal PT.

An embodiment of the present disclosure further provides a display device, including the signal generation circuit provided in the above embodiments.

For example, the display device may include a liquid crystal display device, an organic light-emitting diode display device, a diode display device, etc. When the signal generation circuit is applied to these display devices, the signal generation circuit can adjust the brightness and the frequency of the display device, and can also be used to provide timing signals for GOA and EOA in the display device.

It should be noted that the display device may be any product or component with display function, such as television, monitor, digital photo frame, mobile phone, tablet computer, etc. The display device also includes a flexible circuit board, a printed circuit board, and a backplane.

In the signal generation circuit provided by the above embodiments, by changing the data voltage value of the adjustable data signal input terminal DG and setting the level value of the analog signal input terminal SA to linearly change in each output stage, the duration during which the output control node G1 is at the first potential and the duration during which the output control node G1 is at the second potential can be controlled, thereby controlling the duration during which the target signal is at the effective level and the duration during which the target signal is at the ineffective level, and achieving the adjustment of the duty cycle of the target signal.

Moreover, in the signal generation circuit provided in the embodiment of the present disclosure, whether to turn on the first control sub-circuit 1 can be controlled by the control signal inputted from the control signal input terminal HF, whether to turn on the second control sub-circuit 2 can be controlled by the adjustable data signal inputted from the adjustable data signal input terminal DG and the analog signal inputted from the analog signal input terminal SA. Therefore, the frequency of the target signal periodically outputted is determined jointly by the control signal input terminal HF, the adjustable data signal input terminal DG, and the analog signal input terminal SA.

Therefore, in the signal generation circuit provided in the embodiments of the present disclosure, real-time adjustment of the period, the frequency and the duty cycle of the target signal outputted by the target output terminal Gout can be achieved just by adjusting the control signal, the adjustable data signal, and the analog signal. Therefore, the signal generation circuit provided in the embodiments of the present disclosure can adjust the frequency and the duty cycle of the target signal without occupying too many channels of the driving chip. In this way, it is more conducive to achieving high-resolution layout of a display product and real-time adjustment of display brightness and frequency when applying the signal generation circuit provided in the embodiments of the present disclosure to the display product.

Therefore, the display device provided in the embodiments of the present disclosure also has the above-mentioned beneficial effects when including the signal generation circuit provided in the above embodiments, which will not be repeated here.

An embodiment of the present disclosure further provides a driving method of a signal generation circuit, used to drive the signal generation circuit provided in the above embodiments. The driving method includes periodic output stages, and the output stage includes a first level output phase and a second level output phase; a periodic analog signal is inputted into the analog signal input terminal SA; in one of the output stages, the level value of the analog signal varies linearly.

In the first level output phase, the second control sub-circuit 2 controls the electrical connection between the analog signal input terminal SA and the output control node G1 to be turned off under the joint control of the adjustable data signal input terminal DG and the analog signal input terminal SA.

In an initial time of the first level output phase, the first control sub-circuit 1 controls the electrical connection between the first level signal input terminal P1 and the output control node G1 to be turned on under the control of the control signal input terminal HF. In a non-initial time of the first level output phase, the first control sub-circuit 1 controls the electrical connection between the first level signal input terminal P1 and the output control node G1 to be turned off under the control of the control signal input terminal HF.

In the second level output phase, the first control sub-circuit 1 controls the electrical connection between the first level signal input terminal P1 and the output control node G1 to be turned off under the control of the control signal input terminal HF; the second control sub-circuit 2 controls the electrical connection between the analog signal input terminal SA and the output control node G1 to be turned on under the joint control of the adjustable data signal input terminal DG and the analog signal input terminal SA.

When the signal generation circuit is driven by using the driving method provided in the embodiments of the present disclosure, by changing the data voltage value of the adjustable data signal input terminal DG and setting the level value of the analog signal input terminal SA to linearly change in each output stage, the duration during which the output control node G1 is at the first potential and the duration during which the output control node G1 is at the second potential can be controlled, thereby controlling the duration during which the target signal is at the effective level and the duration during which the target signal is at the ineffective level, and achieving the adjustment of the duty cycle of the target signal.

Moreover, in the signal generation circuit provided in the embodiment of the present disclosure, whether to turn on the first control sub-circuit 1 can be controlled by the control signal inputted from the control signal input terminal HF, whether to turn on the second control sub-circuit 2 can be controlled by the adjustable data signal inputted from the adjustable data signal input terminal DG and the analog signal inputted from the analog signal input terminal SA. Therefore, the frequency of the target signal periodically outputted is determined jointly by the control signal input terminal HF, the adjustable data signal input terminal DG, and the analog signal input terminal SA.

Therefore, when the signal generation circuit is driven by using the driving method provided in the embodiments of the present disclosure, the period, the frequency and the duty cycle of the target signal outputted by the target output terminal Gout can be adjusted in real time just by adjusting the control signal, the adjustable data signal, and the analog signal. Therefore, the signal generation circuit provided in the embodiments of the present disclosure can adjust the frequency and the duty cycle of the target signal without occupying too many channels of the driving chip. In this way, it is more conducive to achieving high-resolution layout of a display product and real-time adjustment of display brightness and frequency when applying the signal generation circuit provided in the embodiments of the present disclosure to the display product.

In some embodiments, the signal generation circuit further includes an output control sub-circuit 3, where the output control node G1 is coupled to the target output terminal Gout through the output control sub-circuit 3, and the output control sub-circuit 3 is further coupled to the first level signal input terminal P1 and the second level signal input terminal P2. The driving method further includes:

- in the first level output phase, controlling, by the output control sub-circuit 3, the target output terminal Gout to receive a second level signal outputted by the second level signal input terminal under the control of the output control node G1; and
- in the second level output phase, controlling, by the output control sub-circuit 3, the target output terminal Gout to receive a first level signal outputted by the first level signal input terminal under the control of the output control node G1.

In some embodiments, in the first level output phase, the output control sub-circuit 3 controls the electrical connection between the first level signal input terminal P1 and the target output terminal Gout to be turned on under the control of the first level signal input terminal P1; the output control sub-circuit 3 controls the electrical connection between the second level signal input terminal P2 and the target output terminal Gout to be turned on under the control of the output control node G1; in the second level output phase, the output control sub-circuit 3 controls the electrical connection between the first level signal input terminal P1 and the target output terminal Gout to be turned on under the control of the first level signal input terminal P1; the output control sub-circuit 3 controls the electrical connection between the second level signal input terminal P2 and the target output terminal Gout to be turned off under the control of the output control node G1.

In some embodiments, the output control sub-circuit 3 includes: a first control unit 31 and a second control unit 32; a first terminal of the first control unit 31 is coupled to the output control node G1, a second terminal of the first control unit 31 is coupled to the second level signal input terminal P2, and a third terminal of the first control unit 31 is coupled to the target output terminal; a first terminal of the second control unit 32 is coupled to the first level signal input terminal P1, a second terminal of the second control unit 32 is coupled to the first level signal input terminal P1, and a third terminal of the second control unit 32 is coupled to the target output terminal.

In the first level output phase, the first control unit 31 controls the electrical connection between the second level signal input terminal and the target output terminal to be turned on under the control of the output control node G1; the second control unit 32 controls the electrical connection between the first level signal input terminal P1 and the third terminal of the second control unit 32 to be turned on under the control of the first level signal input terminal PT.

In the second level output phase, the first control unit 31 controls the electrical connection between the second level signal input terminal and the target output terminal to be turned off under the control of the output control node G1; the second control unit 32 controls the electrical connection between the first level signal input terminal P1 and the target output terminal Gout to be turned on under the control of the first level signal input terminal P T.

In some embodiments, the signal generation circuit further includes: a first output compensation sub-circuit 4, where the third terminal of the first control unit 31 and the third terminal of the second control unit 32 are coupled to each other, and are coupled to the target output terminal through the first output compensation sub-circuit 4; the first output compensation sub-circuit 4 is further coupled to the first level signal input terminal P1, the second level signal input terminal P2, and the output control node G1; the driving method further includes:

- in the first level output phase, the first output compensation sub-circuit 4 controls the electrical connection between the second level signal input terminal P2 and the target output terminal Gout to be turned on under the control of the output control node G1; the first output compensation sub-circuit 4 further controls the electrical connection between the first level signal input terminal P1 and the target output terminal Gout to be turned off under the control of the third terminal of the first control unit 31; and
- in the second level output phase, the first output compensation sub-circuit 4 controls the electrical connection between the second level signal input terminal P2 and the target output terminal Gout to be turned off under the control of the output control node G1; the first output compensation sub-circuit 4 further controls the electrical connection between the first level signal input terminal P1 and the target output terminal Gout to be turned on under the control of the third terminal of the first control unit 31.

In some embodiments, the signal generation circuit further includes a second output compensation sub-circuit 5, where the third terminal of the first control unit 31 and the third terminal of the second control unit 32 are coupled to each other, and are coupled to the target output terminal through the second output compensation sub-circuit 5; the second output compensation sub-circuit 5 is further coupled to the control signal input terminal HF, the first level signal input terminal P1, and the second level signal input terminal P2; and the driving method further includes:

- in the first level output phase, the second output compensation sub-circuit 5 controls the electrical connection between the second level signal input terminal P2 and the target output terminal Gout to be turned off under the control of the third terminal of the first control unit 31; the second output compensation sub-circuit 5 further controls the electrical connection between the first level signal input terminal P1 and the target output terminal Gout to be turned on under the control of the control signal input terminal HF; and
- in the second level output phase, the second output compensation sub-circuit 5 controls the electrical connection between the second level signal input terminal P2 and the target output terminal Gout to be turned on under the control of the third terminal of the first control unit 31; the second output compensation sub-circuit 5 further controls the electrical connection between the first level signal input terminal P1 and the target output terminal Gout to be turned off under the control of the control signal input terminal HF.

In some embodiments, during the first level output phase, the output control sub-circuit 3 is configured to control the electrical connection between the second level signal input terminal P2 and the target output terminal Gout to be turned on under the control of the output control node G1, and is further configured to control the electrical connection between the first level signal input terminal P1 and the target output terminal Gout to be turned off under the control of the output control node G1.

In the second level output phase, the output control sub-circuit 3 is configured to control the electrical connection between the second level signal input terminal P2 and the target output terminal Gout to be turned off under the control of the output control node G1, and is further configured to control the electrical connection between the first level signal input terminal P1 and the target output terminal Gout to be turned on under the control of the output control node G1.

In some embodiments, the signal generation circuit further includes a third output compensation sub-circuit 6, coupled to the target output terminal Gout, the second level signal input terminal P2, and the output control node G1; and the driving method further includes:

in the first level output phase, the third output compensation sub-circuit 6 controls the electrical connection between the second level signal input terminal P2 and the output control node G1 to be turned off under the control of the target output terminal Gout; and in the second level output phase, the third output compensation sub-circuit 6 controls the electrical connection between the second level signal input terminal P2 and the output control node G1 to be turned on under the control of the target output terminal Gout.

It is worth noting that the beneficial effects generated by the above driving methods can be found in the description of the corresponding structure parts of the signal generation circuit, which will not be repeated here.

It should be noted that the term "same layer" in the embodiments of the present disclosure refers to film layers located on a same structural layer. Alternatively, for example, film layers on the same layer can be formed using a same film-forming process to form a specific pattern, and then patterned using a same mask through a single patterning process to form a layer structure. Depending on the specific pattern, the single patterning process may include multiple exposures, developments, or etching processes, and the specific pattern in the formed layer structure may be continuous or discontinuous. These specific shapes may also be at different heights or have different thicknesses.

In the embodiments of the method of the present disclosure, the serial number of each step cannot be used to limit an order of each step. For ordinary person in the art, the change in the order of each step shall also fall within the protection scope of the present disclosure without creative effort.

It should be noted that multiple embodiments in this specification are described in a progressive manner, reference can be made to each other for the same and similar parts between multiple embodiments, and each embodiment focuses on the differences from other embodiments. Especially for the method embodiments, the description is relatively simple, because they are basically similar to the product embodiments, and for relevant information, reference can be made to the description in the product embodiments.

Unless otherwise defined, technical or scientific terms used in the present disclosure shall have the usual meanings as understood by persons with general skills in the field to which the present disclosure belongs. Terms "first", "second" and the like in the present disclosure do not indicate any order, quantity, or importance, but are only used to distinguish different components. Word "include", "include" or the like refer to that an element or an object that appears before the word includes elements, or objects, or equivalents thereof listed after the word, and does not exclude other elements or objects. The term such as "connect", "couple", or "interconnect" is not limited to physical or mechanical connection, and can include electrical connection, whether direct or indirect connection. Terms such as "on", "under", "left", "right" are only used to represent a relative positional relationship, and the relative positional relationship may also change accordingly when the absolute position of the described object changes.

It is appreciated that when an element such as a layer, a film, a region, or a substrate is referred to as being located "on" or "under" another element, the element may be "directly" located "on" or "under" the other element, or there may be an intermediate element.

In the description of the above embodiments, specific features, structures, materials, or characteristics may be combined in any one or more embodiments or examples in a suitable manner.

The above embodiments are only specific implementations of the present disclosure, and the protection scope of the present disclosure is not limited thereto. Any skilled person in the art can easily think of changes or replacements within the technical scope disclosed in the present disclosure, which shall fall within the protection scope of the present disclosure. Therefore, the protection scope of the present disclosure should be subjected to the protection scope of the claims.

What is claimed is:

1. A signal generation circuit, comprising: a first control sub-circuit, a second control sub-circuit, an output control node and a target output terminal, wherein the output control node is coupled to the target output terminal;

the first control sub-circuit is coupled to a control signal input terminal, a first level signal input terminal and the output control node, and is configured to control an electrical connection between the first level signal input terminal and the output control node to be turned on or turned off under the control of the control signal input terminal; and the second control sub-circuit is coupled to an adjustable data signal input terminal, an analog signal input terminal and the output control node, and is configured to control an electrical connection between the analog signal input terminal and the output control node to be turned on or turned off under the joint control of the adjustable data signal input terminal and the analog signal input terminal.

2. The signal generation circuit according to claim 1, further comprising:

an output control sub-circuit, wherein the output control node is coupled to the target output terminal through the output control sub-circuit, the output control sub-circuit is further coupled to the first level signal input terminal and a second level signal input terminal, and the output control sub-circuit is configured to: under the control of the output control node, control the target output terminal to receive a first level signal outputted by the first level signal input terminal, or to control the target output terminal to receive a second level signal outputted by the second level signal input terminal.

3. The signal generation circuit according to claim 2, wherein the output control sub-circuit is configured to control the electrical connection between the second level signal input terminal and the target output terminal to be turned on or turned off under the control of the output control node, and is further configured to control the electrical connection between the first level signal input terminal and the target output terminal to be turned on under the control of the first level signal input terminal.

4. The signal generation circuit according to claim 3, further comprising: a first control unit and a second control unit, wherein a first terminal of the first control unit is coupled to the output control node, a second terminal of the first control unit is coupled to the second level signal input terminal, and a third terminal of the first control unit is coupled to the target output terminal; the first control unit is configured to control the electrical connection between the second level signal input terminal and the target output terminal to be turned on or turned off under the control of the output control node; and a first terminal of the second control unit is coupled to the first level signal input terminal, a second terminal of the second control unit is coupled to the first level signal input terminal, and a third terminal of the second control unit is coupled to the target output terminal; the second control unit is configured to control the electrical connection between the first level signal input terminal and the target output terminal to be turned on or turned off under the control of the first level signal input terminal.

5. The signal generation circuit according to claim 4, further comprising: a first output compensation sub-circuit, wherein the third terminal of the first control unit and the third terminal of the second control unit are coupled to each other, and are coupled to the target output terminal through the first output compensation sub-circuit; the first output compensation sub-circuit is further coupled to the first level signal input terminal, the second level signal input terminal, and the output control node; and the first output compensation sub-circuit is configured to control the electrical connection between the second level signal input terminal and the target output terminal to be turned on or turned off under the control of the output control node, and is further configured to control the electrical connection between the first level signal input terminal and the target output terminal to be turned on or turned off under the control of the third terminal of the first control unit.

6. The signal generation circuit according to claim 5, wherein the first output compensation sub-circuit comprises: a third control unit and a fourth control unit;

the third control unit is coupled to the output control node, the second level signal input terminal, and the target output terminal, and is configured to control the electrical connection between the second level signal input terminal and the target output terminal to be turned on or turned off under the control of the output control node; and the fourth control unit is coupled to the third terminal of the first control unit, the first level signal input terminal, and the target output terminal, and is configured to control the electrical connection between the first level signal input terminal and the target output terminal to be turned on or turned off under the control of the third terminal of the first control unit.

7. The signal generation circuit according to claim 6, wherein the first control sub-circuit comprises a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit comprises a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit comprises a third transistor, and a gate electrode of the third transistor and a second electrode of the third transistor are both coupled to the first level signal input terminal;

the first control unit comprises a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal;

the fourth control unit comprises a fifth transistor, a gate electrode of the fifth transistor is coupled to the first electrode of the fourth transistor, a first electrode of the fifth transistor is coupled to the first level signal input terminal, and a second electrode of the fifth transistor is coupled to the target output terminal; and the third control unit comprises a sixth transistor, a gate electrode of the sixth transistor is coupled to the output control node, a first electrode of the sixth transistor is coupled to the second level signal input terminal, and a second electrode of the sixth transistor is coupled to the target output terminal.

8. The signal generation circuit according to claim 4, further comprising a second output compensation sub-circuit, wherein the third terminal of the first control unit and the third terminal of the second control unit are coupled to each other, and are coupled to the target output terminal through the second output compensation sub-circuit; the second output compensation sub-circuit is further coupled to the control signal input terminal, the first level signal input terminal, and the second level signal input terminal; and the second output compensation sub-circuit is configured to control the electrical connection between the second level signal input terminal and the target output terminal to be turned on or turned off under the control of the third terminal of the first control unit; and is further configured to control the electrical connection between the first level signal input terminal and the target output terminal to be turned on or turned off under the control of the control signal input terminal, wherein the second output compensation sub-circuit comprises: a fifth control unit and a sixth control unit;

the fifth control unit is coupled to the third terminal of the first control unit, the second level signal input terminal, and the target output terminal, and is configured to control the electrical 8 connection between the second level signal input terminal and the target output terminal to be turned on or turned off under the control of the third terminal of the first control unit; and the sixth control unit is coupled to the control signal input terminal, the first level signal input terminal, and the target output terminal, and is configured to control the electrical connection between the first level signal input terminal and the target output terminal to be turned on or turned off under the control of the control signal input terminal.

9. The signal generation circuit according to claim 8, wherein the first control sub-circuit comprises a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit comprises a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit comprises a third transistor, and a gate electrode of the third transistor and a second electrode of the third transistor are both coupled to the first level signal input terminal;

the first control unit comprises a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal;

the sixth control unit comprises an eighth transistor and a second capacitor; a gate electrode of the eighth transistor is coupled to the control signal input terminal, a first electrode of the eighth transistor is coupled to the first level signal input terminal, and a second electrode of the eighth transistor is coupled to the target output terminal; a first electrode plate of the second capacitor is coupled to the first level signal input terminal, a second electrode plate of the second capacitor is coupled to the target output terminal; and the fifth control unit comprises a ninth transistor, a gate electrode of the ninth transistor is coupled to the first electrode of the fourth transistor, a first electrode of the ninth transistor is coupled to the second level signal input terminal, and a second electrode of the ninth transistor is coupled to the target output terminal.

10. The signal generation circuit according to claim 4, wherein the first control sub-circuit comprises a first transistor, a gate electrode of the first transistor is coupled to the control signal input terminal, a first electrode of the first transistor is coupled to the first level signal input terminal, and a second electrode of the first transistor is coupled to the output control node;

the second control sub-circuit comprises a second transistor, a gate electrode of the second transistor is coupled to the adjustable data signal input terminal, a first electrode of the second transistor is coupled to the analog signal input terminal, and a second electrode of the second transistor is coupled to the output control node;

the second control unit comprises a third transistor, and a gate electrode of the third transistor and a second electrode of the third transistor are both coupled to the first level signal input terminal; and the first control unit comprises a fourth transistor, a gate electrode of the fourth transistor is coupled to the output control node, a first electrode of the fourth transistor is coupled to the first electrode of the third transistor, and a second electrode of the fourth transistor is coupled to the second level signal input terminal.

11. The signal generation circuit according to claim 2, wherein the output control sub-circuit is configured to control the electrical connection between the second level signal input terminal and the target output terminal to be turned on or turned off under the control of the output control node, and is further configured to control the electrical connection between the first level signal input terminal and the target output terminal to be turned on or turned off under the control of the output control node, wherein the output control sub-circuit comprises a seventh control unit and an eighth control unit;

the seventh control unit is coupled to the output control node, the second level signal input terminal, and the target output terminal, and is configured to control the electrical connection between the second level signal input terminal and the target output terminal to be turned on or turned off under the control of the output control node; and the eighth control unit is coupled to the output control node, the first level signal input terminal, and the target output terminal, and is configured to control the electrical connection between the first level signal input terminal and the target output terminal to be turned on or turned off under the control of the output control node.

12. The signal generation circuit according to claim 11, further comprising:

a third output compensation sub-circuit, coupled to the target output terminal, the second level signal input terminal and the output control node, and configured to control the electrical connection between the second level signal input terminal and the output control node to be turned on or turned off under the control of the target output terminal.

13. The signal generation circuit according to claim 12, wherein the first control sub-circuit comprises a first transistor, wherein a gate electrode of the first transistor is coupled to the control signal input terminal, a first electrode of the first transistor is coupled to the first level signal input terminal, and a second electrode of the first transistor is coupled to the output control node;

the second control sub-circuit comprises a second transistor, a gate electrode of the second transistor is coupled to the adjustable data signal input terminal, a first electrode of the second transistor is coupled to the analog signal input terminal, and a second electrode of the fourth transistor is coupled to the output control node;

the seventh control unit comprises a tenth transistor, a gate electrode of the tenth transistor is coupled to the output control node, a first electrode of the tenth transistor is coupled to the second level signal input terminal, and a second electrode of the tenth transistor is coupled to the target output terminal; and the eighth control unit comprises an eleventh transistor, a gate electrode of the eleventh transistor is coupled to the output control node, a first electrode of the eleventh transistor is coupled to the first level signal input terminal, and a second electrode of the eleventh transistor is coupled to the target output terminal; one of the eleventh transistor and the tenth transistor is a P-type transistor, and another of the eleventh transistor and the tenth transistor is an N-type transistor, wherein the third output compensation sub-circuit comprises a twelfth transistor, a gate electrode of the twelfth transistor is coupled to the target output terminal, a first electrode of the twelfth transistor is coupled to the second level signal input terminal, and a second electrode of the twelfth transistor is coupled to the output control node.

14. The signal generation circuit according to claim 1, wherein the first control sub-circuit comprises a first transistor, a gate electrode of the first transistor is coupled to the control signal input terminal, a first electrode of the first transistor is coupled to the first level signal input terminal, and a second electrode of the first transistor is coupled to the output control node; and the second control sub-circuit comprises a second transistor, a gate electrode of the second transistor is coupled to the adjustable data signal input terminal, a first electrode of the second transistor is coupled to the analog signal input terminal, and a second electrode of the second transistor is coupled to the output control node.

15. The signal generation circuit according to claim 1, wherein the signal generation circuit further comprises a capacitor structure, a first end of the capacitor structure is coupled to the output control node, and a second end of the capacitor structure is coupled to the first level signal input terminal; or wherein the analog signal input terminal is used to input an analog signal with periodicity, and a level value of the analog signal varies linearly within one cycle.

16. A display device, comprising the signal generation circuit according to claim 1.

17. A driving method of a signal generation circuit, for driving the signal generation circuit according to claim 1, wherein the driving method comprises periodic output stages, and the output stage comprises a first level output phase and a second level output phase, wherein a periodic analog signal is inputted into the analog signal input terminal; in one of the output stages, a level value of the analog signal varies linearly;

in the first level output phase, controlling, by the second control sub-circuit, the electrical connection between the analog signal input terminal and the output control node to be turned off under the joint control of the adjustable data signal input terminal and the analog signal input terminal;

in an initial time of the first level output phase, controlling, by the first control sub-circuit, the electrical connection between the first level signal input terminal and the output control node to be turned on under the control of the control signal input terminal; and in a non-initial time of the first level output phase, controlling, by the first control sub-circuit, the electrical connection between the first level signal input terminal and the output control node to be turned off under the control of the control signal input terminal; and in the second level output phase, controlling, by the first control sub-circuit, the electrical connection between the first level signal input terminal and the output control node to be turned off under the control of the control signal input terminal, and controlling, by the second control sub-circuit, the electrical connection between the analog signal input terminal and the output control node to be turned on under the joint control of the adjustable data signal input terminal and the analog signal input terminal.

18. The driving method of the signal generation circuit according to claim 17, wherein the signal generation circuit further comprises an output control sub-circuit, the output control node is coupled to the target output terminal through the output control sub-circuit, and the output control sub-circuit is further coupled to the first level signal input terminal and the second level signal input terminal; and the driving method further comprises:

in the first level output phase, controlling, by the output control sub-circuit, the target output terminal to receive a second level signal outputted by the second level signal input terminal under the control of the output control node; and in the second level output phase, controlling, by the output control sub-circuit, the target output terminal to receive a first level signal outputted by the first level signal input terminal under the control of the output control node, wherein the driving method of the signal generation circuit further comprises:

in the first level output phase, controlling, by the output control sub-circuit, the electrical connection between the first level signal input terminal and the target output terminal to be turned on under the control of the first level signal input terminal, and controlling, by the output control sub-circuit, the electrical connection between the second level signal input terminal and the target output terminal to be turned on under the control of the output control node; and in the second level output phase, controlling, by the output control sub-circuit, the electrical connection between the first level signal input terminal and the target output terminal to be turned on under the control of the first level signal input terminal, and controlling, by the output control sub-circuit, the electrical connection between the second level signal input terminal and the target output terminal to be turned off under the control of the output control node, wherein the output control sub-circuit comprises: a first control unit and a second control unit; a first terminal of the first control unit is coupled to the output control node, a second terminal of the first control unit is coupled to the second level signal input terminal, and a third terminal of the first control unit is coupled to the target output terminal; a first terminal of the second control unit is coupled to the first level signal input terminal, a second terminal of the second control unit is coupled to the first level signal input terminal, and a third terminal of the second control unit is coupled to the target output terminal; and the driving method further comprises:

in the first level output phase, controlling, by the first control unit, the electrical connection between the second level signal input terminal and the target output terminal to be turned on under the control of the output control node, and controlling, by the second control unit, the electrical connection between the first level signal input terminal and the third terminal of the second control unit to be turned on under the control of the first level signal input terminal; and in the second level output phase, controlling, by the first control unit, the electrical connection between the second level signal input terminal and the target output terminal to be turned off under the control of the output control node, and controlling, by the second control unit, the electrical connection between the first level signal input terminal and the target output terminal to be turned on under the control of the first level signal input terminal.

19. The driving method of the signal generation circuit according to claim 18, wherein the signal generation circuit further comprises: a first output compensation sub-circuit, the third terminal of the first control unit and the third terminal of the second control unit are coupled to each other, and are coupled to the target output terminal through the first output compensation sub-circuit; the first output compensation sub-circuit is further coupled to the first level signal input terminal, the second level signal input terminal and the output control node; and the driving method further comprises:

in the first level output phase, controlling, by the first output compensation sub-circuit, the electrical connection between the second level signal input terminal and the target output terminal to be turned on under the control of the output control node, and controlling, by the first output compensation sub-circuit, the electrical connection between the first level signal input terminal and the target output terminal to be turned off under the control of the third terminal of the first control unit; and in the second level output phase, controlling, by the first output compensation sub-circuit, the electrical connection between the second level signal input terminal and the target output terminal to be turned off under the control of the output control node, and controlling, by the first output compensation sub-circuit, the electrical connection between the first level signal input terminal and the target output terminal to be turned on under the control of the third terminal of the first control unit, or, wherein the signal generation circuit further comprises a second output compensation sub-circuit, wherein the third terminal of the first control unit and the third terminal of the second control unit are coupled to each other, and are coupled to the target output terminal through the second output compensation sub-circuit; the second output compensation sub-circuit is further coupled to the control signal input terminal, the first level signal input terminal, and the second level signal input terminal; and the driving method further comprises:

in the first level output phase, controlling, by the second output compensation sub-circuit, the electrical connection between the second level signal input terminal and the target output terminal to be turned off under the control of the third terminal of the first control unit, and controlling, by the second output compensation sub-circuit, the electrical connection between the first level signal input terminal and the target output terminal to be turned on under the control of the control signal input terminal; and in the second level output phase, controlling, by the second output compensation sub-circuit, the electrical connection between the second level signal input terminal and the target output terminal to be turned on under the control of the third terminal of the first control unit, and controlling, by the second output compensation sub-circuit, the electrical connection between the first level signal input terminal and the target output terminal to be turned off under the control of the control signal input terminal.

20. The driving method of the signal generation circuit according to claim 18, further comprising:

in the first level output phase, controlling, by the output control sub-circuit, the electrical connection between the second level signal input terminal and the target output terminal to be turned on under the control of the output control node, and controlling, by the output control sub-circuit, the electrical connection between the first level signal input terminal and the target output terminal to be turned off under the control of the output control node; and in the second level output phase, controlling, by the output control sub-circuit, the electrical connection between the second level signal input terminal and the target output terminal to be turned off under the control of the output control node, and controlling, by the output control sub-circuit, the electrical connection between the first level signal input terminal and the target output terminal to be turned on under the control of the output control node, wherein the signal generation circuit further comprises a third output compensation sub-circuit, coupled to the target output terminal, the second level signal input terminal and the output control node; and the driving method further comprises:

in the first level output phase, controlling, by the third output compensation sub-circuit, the electrical connection between the second level signal input terminal and the output control node to be turned off under the control of the target output terminal; and in the second level output phase, controlling, by the third output compensation sub-circuit, the electrical connection between the second level signal input terminal and the output control node to be turned on under the control of the target output terminal.

* * * * *